United States Patent

Breed et al.

Patent Number: 6,078,854
Date of Patent: Jun. 20, 2000

[54] APPARATUS AND METHOD FOR ADJUSTING A VEHICLE COMPONENT

[75] Inventors: David S. Breed, Boonton Township, Morris County, N.J.; Wilbur E. DuVall, Kimberling City, Mo.; Jeffrey L. Morin, Grosse Ile, Mich.

[73] Assignee: Automotive Technologies International, Inc., Denville, N.J.

[21] Appl. No.: 09/128,490

[22] Filed: Aug. 4, 1998

Related U.S. Application Data

[63] Continuation-in-part of application No. 08/474,783, Jun. 7, 1995, Pat. No. 5,822,707, and application No. 08/970,822, Nov. 14, 1997.

[51] Int. Cl.⁷ ................................................. B60R 21/00
[52] U.S. Cl. ........................... 701/49; 701/45; 318/467; 280/735; 180/273
[58] Field of Search .................... 701/45, 46, 47, 701/49; 318/286, 466, 467, 468; 280/728.1, 734, 735; 180/271, 273, 268; 307/10.1

[56] References Cited

U.S. PATENT DOCUMENTS

| | | | |
|---|---|---|---|
| 3,275,975 | 9/1966 | King | 180/272 |
| 4,519,652 | 5/1985 | Kamijo | 180/268 |
| 4,625,320 | 11/1986 | Ishikawa | 382/104 |
| 4,645,233 | 2/1987 | Bruse et al. | 280/753 |
| 4,698,571 | 10/1987 | Mizuta et al. | 318/466 |
| 4,811,226 | 3/1989 | Shinohara | 318/466 |
| 5,008,946 | 4/1991 | Ando | 180/167 |
| 5,071,160 | 12/1991 | White et al. | 280/735 |
| 5,074,583 | 12/1991 | Fujita | 280/735 |
| 5,118,134 | 6/1992 | Mattes | 280/735 |
| 5,125,686 | 6/1992 | Yano | 280/801.2 |
| 5,155,685 | 10/1992 | Kishi et al. | 364/424.05 |
| 5,161,820 | 11/1992 | Vollmer | 280/730 |
| 5,232,243 | 8/1993 | Blackburn et al. | 280/735 |
| 5,254,924 | 10/1993 | Ogasawara | 364/424.05 |
| 5,330,226 | 7/1994 | Gentry et al. | 280/735 |
| 5,377,108 | 12/1994 | Nishio | 701/45 |
| 5,413,378 | 5/1995 | Steffens, Jr. et al. | 280/735 |
| 5,439,249 | 8/1995 | Steffens, Jr. et al. | 280/735 |
| 5,454,591 | 10/1995 | Mazur et al. | 280/735 |
| 5,474,327 | 12/1995 | Schousek | 280/735 |
| 5,531,472 | 7/1996 | Semchena et al. | 280/735 |
| 5,573,269 | 11/1996 | Gentry et al. | 280/735 |
| 5,583,771 | 12/1996 | Lynch et al. | 701/45 |
| 5,653,462 | 8/1997 | Breed et al. | 280/735 |
| 5,670,853 | 9/1997 | Bauer | 318/286 |
| 5,694,320 | 12/1997 | Breed | 364/424.055 |
| 5,702,123 | 12/1997 | Takahashi et al. | 280/735 |
| 5,748,473 | 5/1998 | Breed et al. | 364/424.055 |
| 5,785,347 | 7/1998 | Adolph et al. | 280/735 |
| 5,822,707 | 10/1998 | Breed et al. | 701/49 |

FOREIGN PATENT DOCUMENTS

| | | | |
|---|---|---|---|
| 2289332 | 11/1995 | United Kingdom | 280/735 |

*Primary Examiner*—Gary Chin
*Attorney, Agent, or Firm*—Brian Roffe

[57] ABSTRACT

A seat adjustment apparatus for adjusting a seat in a passenger compartment of a vehicle including wave sensors for transmitting waves into the passenger compartment toward the seat, receiving reflected waves from the passenger compartment and generating an output representative of the reflected waves received by the wave sensors, weight sensors associated with the seat for measuring the weight applied onto the seat and generating an output representative of the measured weight applied onto the seat and a processor for receiving the outputs from the wave sensors and the weight sensors and evaluating the seated-state of the seat based thereon. The processor directs a control unit to cause a portion of the seat to move based on the evaluation of the seated-state of the seat.

47 Claims, 19 Drawing Sheets

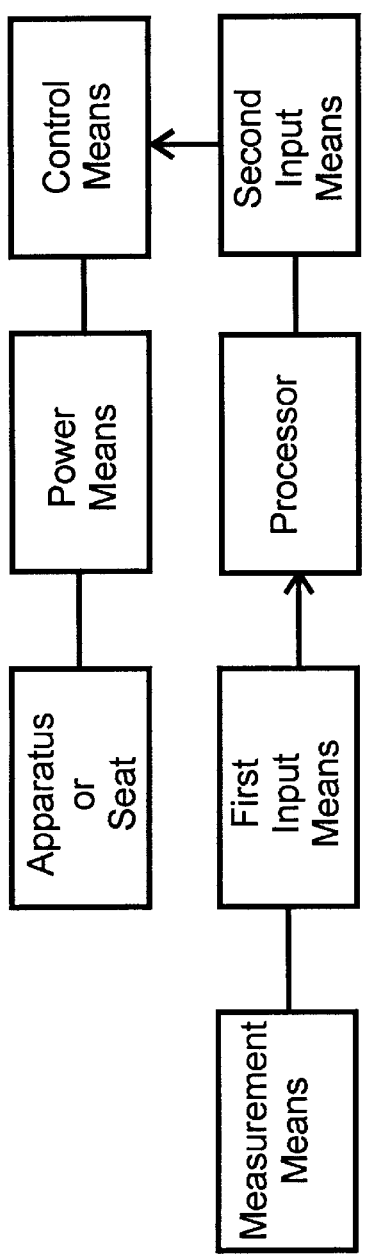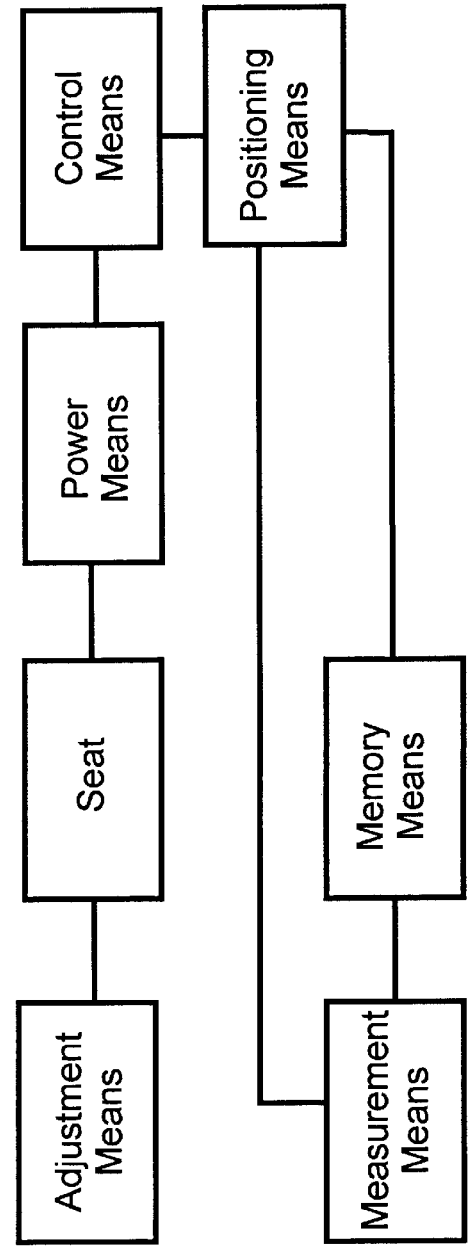

APPARATUS AND METHOD FOR ADJUSTING A VEHICLE COMPONENT

CROSS REFERENCE TO RELATED APPLICATIONS

This application is a continuation-in-part of U.S. patent application Ser. No. 08/474,783 filed Jun. 7, 1995 (now U.S. Pat. No. 5,822,707) and a continuation-in-part of U.S. patent application Ser. No. 08/970,822 filed Nov. 14, 1997.

FIELD OF THE INVENTION

The present invention relates to apparatus and methods for adjusting a vehicle component, system or subsystem in which the occupancy of a seat, also referred to as the "seated state" herein, is evaluated using sensors and the component, system or subsystem may then be adjusted based on the evaluated occupancy thereof. The vehicle component, system or subsystem, hereinafter referred to simply as a component, may be any adjustable component of the vehicle including, but not limited to, the bottom portion and backrest of the seat, the rear view and side mirrors, the brake, clutch and accelerator pedals, the steering wheel, the steering column, a seat armrest, a cup holder, the mounting unit for a cellular telephone or another communications or computing device and the visors. Further, the component may be a system such an as airbag system, the deployment of which is controlled based on the seated-state of the seat. The component may also be an adjustable portion of a system the operation of which might be advantageously adjusted based on the seated-state of the seat, such as a device for regulating the inflation or deflation of an airbag that is associated with an airbag system.

The present invention also relates to apparatus and method for automatically adjusting a vehicle component to a selected or optimum position for an occupant of a seat based on two measured morphological characteristics of the occupant. Morphological characteristics include the weight of the occupant, the height of the occupant, the length of the occupant's arms, the length of the occupant's legs, the occupant's head diameter and the inclination of the occupant's back relative to the seat bottom. Other morphological characteristics are also envisioned for use in the invention.

BACKGROUND OF THE INVENTION

Automobiles equipped with airbags are well known in the prior art. In such airbag systems, the car crash is sensed and the airbags rapidly inflated thereby ensuring the safety of an occupation in a car crash. Many lives have now been saved by such airbag systems. However, depending on the seated state of an occupant, there are cases where his or her life cannot be saved even by present airbag systems. For example, when a passenger is seated on the front passenger seat in a position other than a forward facing, normal state, e.g., when the passenger is out of position and near the deployment door of the airbag, there will be cases when the occupant will be seriously injured or even killed by the deployment of the airbag.

Also, sometimes a child seat is placed on the passenger seat in a rear facing position and there are cases where a child sitting in such a seat has been seriously injured or killed by the deployment of the airbag.

Furthermore, in the case of a vacant seat, there is no need to deploy an airbag, and in such a case, deploying the airbag is undesirable due to a high replacement cost and possible release of toxic gases into the passenger compartment. Nevertheless, most airbag systems will deploy the airbag in a vehicle crash even if the seat is unoccupied.

For these reasons, there has been proposed a seated-state detecting unit such as disclosed in the following U.S. Patents and Patent applications, which are included herein by reference, assigned to the current assignee of the present application: Breed et al (U.S. Pat. No. 5,563,462); Breed et al (U.S. patent application Ser. No. 08/640,068 filed Apr. 30, 1996); Breed et al (U.S. patent application Ser. No. 08/474,783 filed Jun. 7, 1995): Breed et al (U.S. Pat. No. 5,694,320); Breed et al (U.S. Pat. No. 5,748,473); and Varga et al (U.S. patent application Ser. No. 08/798,029 filed Feb. 6, 1997). Typically, in some of these designs four sets of sensors are installed at four points in a vehicle passenger compartment for transmitting ultrasonic or electromagnetic waves toward the passenger or driver's seat and receiving the reflected waves. Using appropriate hardware and software, the approximate configuration of the occupancy of either the passenger or driver seat can be determined thereby identifying and categorizing the occupancy of the relevant seat.

However, in the aforementioned literature using ultrasonics, the pattern of reflected ultrasonic waves from an adult occupant who may be out of position is sometimes similar to the pattern of reflected waves from a rear facing child seat. Also, it is sometimes difficult to discriminate the wave pattern of a normally seated child with the seat in a rear facing position from an empty seat with the seat in a more forward position. In other cases, the reflected wave pattern from a thin slouching adult with raised knees can be similar to that from a rear facing child seat. In still other cases, the reflected pattern from a passenger seat which is in a forward position can be similar to the reflected wave pattern from a seat containing a forward facing child seat or a child sitting on the passenger seat. In each of these cases, the prior art ultrasonic systems can suppress the deployment of an airbag when deployment is desired or, alternately, can enable deployment when deployment is not desired.

If the discrimination between these cases can be improved, then the reliability of the seated-state detecting unit can be improved and more people saved from death or serious injury. In addition, the unnecessary deployment of an airbag can be prevented.

With respect to the adjustment of a vehicular seat, the adjustment of an automobile seat occupied by a driver of the vehicle is now accomplished by the use of either electrical switches and motors or by mechanical levers. As a result, the driver's seat is rarely placed at the proper driving position which is defined as the seat location which places the eyes of the driver in the so-called "eye ellipse" and permits him or her to comfortably reach the pedals and steering wheel. The "eye ellipse" is the optimum eye position relative to the windshield and rear view mirror of the vehicle.

The eye ellipse, which is actually an ellipsoid, is rarely achieved by the actions of the driver for a variety of reasons. One specific reason is the poor design of most seat adjustment systems particularly the so-called "4-way-seat". It is known that there are three degrees of freedom of a seat bottom, namely vertical, longitudinal, and rotation about the lateral or pitch axis. The 4-way-seat provides four motions to control the seat: (1) raising or lowering the front of the seat, (2) raising or lowering the back of the seat, (3) raising or lowering the entire seat, (4) moving the seat fore and aft. Such a seat adjustment system causes confusion since there are four control motions for three degrees of freedom. As a result, vehicle occupants are easily frustrated by such events as when the control to raise the seat is exercised, the seat not only is raised but is also rotated. Occupants thus find it difficult to place the seat in the optimum location using this system and frequently give up trying leaving the seat in an improper driving position Many vehicles today are equipped with a lumbar support system that is never used by most occupants. One reason is that the lumbar support cannot be preset since the shape of the lumbar for different occupants differs significantly, i.e., a tall person has significantly different lumbar support requirements than a short person. Without knowledge of the size of the occupant, the lumbar support cannot be automatically adjusted.

As discussed in the above referenced '320 patent, in approximately 95% of the cases where an occupant suffers a whiplash injury, the headrest is not properly located to protect him or her in a rear impact collision. Also, the stiffness and damping characteristics of a seat are fixed and no attempt is made in any production vehicle to adjust the stiffness and damping of the seat in relation to the size either or weight of an occupant, or to the environmental conditions such as road roughness. All of these adjustments, if they are to be done automatically, require knowledge of the morphology of the seat occupant.

Systems are now being used to attempt to identify the vehicle occupant based on a coded key or other object carried by the occupant. This requires special sensors within the vehicle to recognize the coded object. Also, the system only works if the coded object is used by the particular person for whom the vehicle was programmed. If the vehicle is used by a son or daughter, for example, who use their mother's key then the wrong seat adjustments are made. Also, these systems preserve the choice of seat position without any regard for the correctness of the seat position. With the problems associated with the 4-way seats, it is unlikely that the occupant ever properly adjusts the seat. Therefore, the error will be repeated every time the occupant uses the vehicle.

Moreover, these coded systems are a crude attempt to identify the occupant. An improvement can be made if the morphological characteristics of the occupant can be measured as described below. Such measurements can be made of the height and weight, for example, and used not only to adjust a vehicular component to a proper position but also to remember that position, as fine tuned by the occupant, for re-positioning the component the next time the occupant occupies the seat. For the purposes herein, a morphological characteristic will mean any measurable property of a human such as height, weight, leg or arm length, head diameter etc.

As discussed more fully below, in a preferred implementation, once at least one and preferably two of the morphological characteristics of a driver are determined, e.g., by measuring his or her height and weight, the component such as the seat can be adjusted and other features or components can be incorporated into the system including, for example, the automatic adjustment of the rear view and/or side mirrors based on seat position and occupant height. In addition, a determination of an out-of-position occupant can be made and based thereon, airbag deployment suppressed if the occupant is more likely to be injured by the airbag than by the accident without the protection of the airbag. Furthermore, the characteristics of the airbag including the amount of gas produced by the inflator and the size of the airbag exit orifices can be adjusted to provide better protection for small lightweight occupants as well as large, heavy people. Even the direction of the airbag deployment can, in some cases, be controlled.

Still other features or components can now be adjusted based on the measured occupant morphology as well as the fact that the occupant can now be identified. Some of these features or components include the adjustment of seat armrest, cup holder, steering wheel (angle and telescoping), pedals, phone location and for that matter the adjustment of all things in the vehicle which a person must reach or interact with. Some items that depend on personal preferences can also be automatically adjusted including the radio station, temperature, ride and others.

Most, if not all, of the problems discussed above are difficult to solve or unsolvable using conventional technology.

OBJECTS OF THE INVENTION

Accordingly, it is a principal object of the present invention to provide new and improved vehicular component adjustment apparatus and methods which evaluate the occupancy of the seat and adjust the location and/or orientation relative to the occupant and/or operation of a part of the component or the component in its entirety based on the evaluated occupancy of the seat.

It is another object of the present invention to provide new and improved adjustment apparatus and methods that evaluate the occupancy of the seat and adjust the location and/or orientation relative to the occupant and/or operation of a part of the component or the component in its entirety based on the evaluated occupancy of the seat and on a measurement of the approximate height of the occupant and/or a measurement of the occupant's weight.

It is another object of the present invention to provide new and improved adjustment apparatus and methods that evaluate the occupancy of the seat by a combination of ultrasonic sensors and additional sensors and adjust the location and/or orientation relative to the occupant and/or operation of a part of the component or the component in its entirety based on the evaluated occupancy of the seat.

It is another object of the present invention to provide new and improved adjustment apparatus and methods that reliably discriminate between a normally seated passenger and a forward facing child seat, between an abnormally seated passenger and a rear facing child seat, and whether or not the seat is empty and adjust the location and/or orientation relative to the occupant and/or operation of a part of the component or the component in its entirety based thereon.

It is another object of the present invention to provide new and improved adjustment apparatus and methods that evaluate the occupancy of the seat without the problems mentioned above.

Additional objects and advantages of this invention include:

1. To provide a system for passively and automatically adjusting the position of a vehicle component to a near optimum location based on the size of an occupant.

2. To provide a system for recognizing a particular occupant of a vehicle and thereafter adjusting various components of the vehicle in accordance with the preferences of the recognized occupant.

3. To provide systems for approximately locating the eyes of a vehicle driver to thereby permit the placement of the driver's eyes at a particular location in the vehicle.

4. To provide a pattern recognition system to permit more accurate location of an occupant's head and the parts thereof and to use this information to adjust a vehicle component.

5. To provide a method of determining whether a seat is occupied and, if not, leaving the seat at a neutral position.

6. To provide a system for automatically adjusting the position of various components of the vehicle to permit safer and more effective operation of the vehicle including the location of the pedals and steering wheel.

7. To determine whether an occupant is out-of-position relative to the airbag and if so, to suppress deployment of the airbag in a situation in which the airbag would otherwise be deployed.

8. To adjust the flow of gas into and out of the airbag based on the morphology and position of the occupant to improve the performance of the airbag in reducing occupant injury.

9. To provide a system where the morphological characteristics of an occupant are measured by sensors located within the seat.

Further objects of the present invention will become apparent from the following discussion of the preferred embodiments of the invention.

SUMMARY OF THE INVENTION

A most basic embodiment of the apparatus in accordance with invention includes a first measuring system for measuring a first morphological characteristic of the occupying item of the seat and a second measuring system for measuring a second morphological characteristic of the occupying item. Morphological characteristic include the weight of the occupying item, the height of the occupying item from the bottom portion of the seat and if the occupying item is a human, the arm length, head diameter and leg length. The apparatus also includes processor means for receiving the output of the first and second measuring systems and for processing the outputs to evaluate a seated-state based on the outputs. The measuring systems described herein, as well as any other conventional measuring systems, may be used in the invention to measure the morphological characteristics of the occupying item.

One preferred embodiment of an adjustment system in accordance with the invention includes a plurality of wave-receiving sensors for receiving waves from the seat and its contents, if any, and one or more weight sensors for detecting weight of an occupant in the seat or an absence of weight applied onto the seat indicative of a vacant seat. The apparatus also includes processor means for receiving the output of the wave-receiving sensors and the weight sensor (s) and for processing the outputs to evaluate a seated-state based on the outputs. The processor means then adjusts adjust a part of the component or the component in its entirety based at least on the evaluation of the seated-state of the seat. The wave-receiving sensors may be ultrasonic sensors, optical sensors or electromagnetic sensors. If the wave-receiving sensors are ultrasonic or optical sensors, then they may also include transmitter means for transmitting ultrasonic or optical waves toward the seat.

If the component is a seat, the system includes power means for moving at least one portion of the seat relative to the passenger compartment and control means connected to the power means for controlling the power means to move the portion(s) of the seat. In this case, the processor means may direct the control means to affect the power means based at least in part on the evaluation of the seated-state of the seat. With respect to the direction or regulation of the control means by the processor means, this may take the form of a regulation signal to the control means that no seat adjustment is needed, e.g., if the seat is occupied by a bag of groceries or a child seat in a rear or forward-facing position as determined by the evaluation of the output from the ultrasonic or optical and weight sensors. On the other hand, if the processor means determines that the seat is occupied by an adult or child for which adjustment of the seat is beneficial or desired, then the processor means may direct the control means to affect the power means accordingly. For example, if a child is detected on the seat, the processor means may be designed to lower the headrest.

In certain embodiments, the apparatus may include one or more sensors each of which measures a morphological characteristic of the occupying item of the seat, e.g., the height or weight of the occupying item, and the processor means are arranged to obtain the input from these sensors and adjust the component accordingly. Thus, once the processor means evaluates the occupancy of the seat and determines that the occupancy is by an adult or child, then the processor means may additionally use either the obtained weight measurement or conduct additional measurements of morphological characteristics of the adult or child occupant and adjust the component accordingly. The processor means may be a single microprocessor for performing all of the functions described above. In the alternative, one microprocessor may be used for evaluating the occupancy of the seat and another for adjusting the component.

The processor means may comprise an evaluation circuit implemented in hardware as an electronic circuit or in software as a computer program.

In certain embodiments, a correlation function or state between the output of the various sensors and the desired result (i.e., seat occupancy identification and categorization) is determined, e.g., by a neural network that may be implemented in hardware as a neural computer or in software as a computer program. The correlation function or state that is determined by employing this neural network may also be contained in a microcomputer. In this case, the microcomputer can be employed as an evaluation circuit. The word circuit herein will be used to mean both an electronic circuit and the fuctional equivalent implemented on a microcomputer using software.

In enhanced embodiments, a heart beat sensor may be provided for detecting the heart beat of the occupant and generating an output representative thereof. The processor means additionally receive this output and evaluate the seated-state of the seat based in part thereon. In addition to or instead of such a heart beat sensor, a capacitive sensor and/or a motion sensor may be provided. The capacitive sensor detects the presence of the occupant and generates an output representative of the presence of the occupant. The motion sensor detects movement of the occupant and generates an output representative thereof. These outputs are provided to the processor means for possible use in the evaluation of the seated-state of the seat.

The portion of the apparatus which includes the ultrasonic, optical or electromagnetic sensors, weight measuring means and processor means which evaluate the occupancy of the seat based on the measured weight of the seat and its contents and the returned waves from the ultrasonic, optical or electromagnetic sensors may be considered to constitute a seated-state detecting unit.

The seated-state detecting unit may further comprise a seat track position-detecting sensor. This sensor determines the position of the seat on the seat track in the forward and aft direction. In this case, the evaluation circuit evaluates the seated-state, based on a correlation function obtain from outputs of the ultrasonic sensors, an output of the one or more weight sensors, and an output of the seat track position detecting sensor. With this structure, there is the advantage that the identification between the flat configuration of a detected surface in a state where a passenger is not sitting in the seat and the flat configuration of a detected surface which is detected when a seat is slid backwards by the amount of the thickness of a passenger, that is, of identification of whether a passenger seat is vacant or occupied by a passenger, can be reliably performed.

Furthermore, the seated-state detecting unit may also comprise a reclining angle detecting sensor, and the evaluation circuit may also evaluate the seated-state based on a correlation function obtained from outputs of the ultrasonic, optical or electromagnetic sensors, an output of the weight sensor(s), and an output of the reclining angle detecting sensor. In this case, if the tilted angle information of the back portion of the seat is added as evaluation information for the seated-state, identification can be clearly performed between the flat configuration of a surface detected when a passenger is in a slightly slouching state and the configuration of a surface detected when the back portion of a seat is slightly tilted forward and similar difficult-to-discriminate cases. This embodiment may even be combined with the output from a seat track position-detecting sensor to further enhance the evaluation circuit.

Moreover, the seated-state detecting unit may further comprise a comparison circuit for comparing the output of the weight sensor(s) with a reference value. In this case, the evaluation circuit identifies an adult and a child based on the reference value.

Preferably, the seated-state detecting unit comprises: a plurality of ultrasonic, optical or electromagnetic sensors for transmitting ultrasonic or electromagnetic waves toward a seat and receiving reflected waves from the seat; one or more weight sensors for detecting weight of a passenger in the seat; a seat track position detecting sensor; a reclining angle detecting sensor; and a neural network circuit to which outputs of the ultrasonic or electromagnetic sensors and the weight sensor(s), an output of the seat track position detecting sensor, and an output of the reclining angle detecting sensor are inputted and which evaluates several kinds of seated-states, based on a correlation function obtained from the outputs.

The kinds of seated-states that can be evaluated and categorized by the neural network include the following categories, among others, (i) a normally seated passenger and a forward facing child seat, (ii) an abnormally seated passenger and a rear-facing child seat, and (iii) a vacant seat.

The seated-state detecting unit may further comprise a comparison circuit for comparing the output of the weight sensor(s) with a reference value and a gate circuit to which the evaluation signal and a comparison signal from the comparison circuit are input. This gate circuit, which may be implemented in software or hardware, outputs signals which evaluates several kinds of seated-states. These kinds of seated-states can include a (i) normally seated passenger, (ii) a forward facing child seat, (iii) an abnormally seated passenger, (iv) a rear facing child seat, and (v) a vacant seat. With this arrangement, the identification between a normally seated passenger and a forward facing child seat, the identification between an abnormally seated passenger and a rear facing child seat, and the identification of a vacant seat can be more reliably performed.

The outputs of the plurality of ultrasonic or electromagnetic sensors, the output of the weight sensor(s), the outputs of the seat track position detecting sensor, and the outputs of the reclining angle detecting sensor are inputted to the neural network or other pattern recognition circuit, and the neural network circuit determines the correlation function, based on training thereof during a training phase. The correlation function is then typically implemented in or incorporated into a microcomputer. For the purposes herein, neural network will be used to include both a single neural network, a plurality of neural networks, and other similar pattern recognition circuits or algorithms and combinations thereof.

To provide the input from the ultrasonic or electromagnetic sensors to the neural network circuit, it is preferable that an initial reflected wave portion and a last reflected wave portion are removed from each of the reflected waves of the ultrasonic or electromagnetic sensors and then the output data is processed. The neural network circuit determines the correlation function by performing a weighting process, based on output data from the plurality of ultrasonic or electromagnetic sensors, output data from the weight sensor(s), output data from the seat track position detecting sensor if present, and/or on output data from the reclining angle detecting sensor if present.

With this arrangement, the portions of the reflected ultrasonic or electromagnetic wave that do not contain useful information are removed from the analysis and the presence and recognition of an object on the passenger seat can be more accurately performed.

In a disclosed method for determining the occupancy of a seat in a passenger compartment of a vehicle in accordance with the invention, waves such as ultrasonic or electromagnetic waves are transmitted into the passenger compartment toward the seat, reflected waves from the passenger compartment are received by a component which then generates an output representative thereof, the weight applied onto the seat is measured and an output is generated representative thereof and then the seated-state of the seat is evaluated based on the outputs from the sensors and the weight measuring means.

The evaluation the seated-state of the seat may be accomplished by generating a function correlating the outputs representative of the received reflected waves and the measured weight and the seated-state of the seat, and incorporating the correlation function into a microcomputer. In the alternative, it is possible to generate a function correlating the outputs representative of the received reflected waves and the measured weight and the seated-state of the seat in a neural network circuit, and execute the function using the outputs representative of the received reflected waves and the measured weight as input into the neural network circuit.

To enhance the seated-state determination, the position of a seat track of the seat is measured and an output representative thereof is generated, and then the seated-state of the seat is evaluated based on the outputs representative of the received reflected waves, the measured weight and the measured seat track position. In addition to or instead of measuring the seat track position, it is possible to measure the reclining angle of the seat, i.e., the angle between the seat portion and the back portion of the seat, and generate an output representative thereof, and then evaluate the seated-state of the seat based on the outputs representative of the received reflected waves, the measured weight and the measured reclining angle of the seat (and seat track position, if measured).

Furthermore, the output representative of the measured weight may be compared with a reference value, and the occupying object of the seat identified, e.g., as an adult or a child, based on the comparison of the measured weight with the reference value.

In additional embodiments, the present invention involves the measurement of one or more morphological characteristics of a vehicle occupant and the use of these measurements to classify the occupant as to size and weight, and then to use this classification to position a vehicle component, such as the seat, to a near optimum position for that class of occupant. Additional information concerning occupant preferences can also be associated with the occupant class so that when a person belonging to that particular class occupies the vehicle, the preferences associated with that class are implemented. These preferences and associated component adjustments include the seat location after it has been manually adjusted away from the position chosen initially by the system, the mirror location, temperature, radio station, steering wheel and steering column positions, etc. The preferred morphological characteristics used are the occupant height from the vehicle seat and weight of the occupant. The height is determined by sensors, usually ultrasonic or electromagnetic, located in the headrest or another convenient location. The weight is determined by one of a variety of technologies that measure either pressure on or displacement of the vehicle seat or the force in the seat supporting structure.

BRIEF DESCRIPTION OF THE DRAWINGS

The following drawings are illustrative of embodiments of the invention and are not meant to limit the scope of the invention as encompassed by the claims.

FIG. 17A is a schematic drawing of the basic embodiment of the adjustment system in accordance with the invention.

FIG. 17B is a schematic drawing of another basic embodiment of the adjustment system in accordance with the invention.

DETAILED DESCRIPTION OF THE PREFERRED EMBODIMENTS

Figure 1:
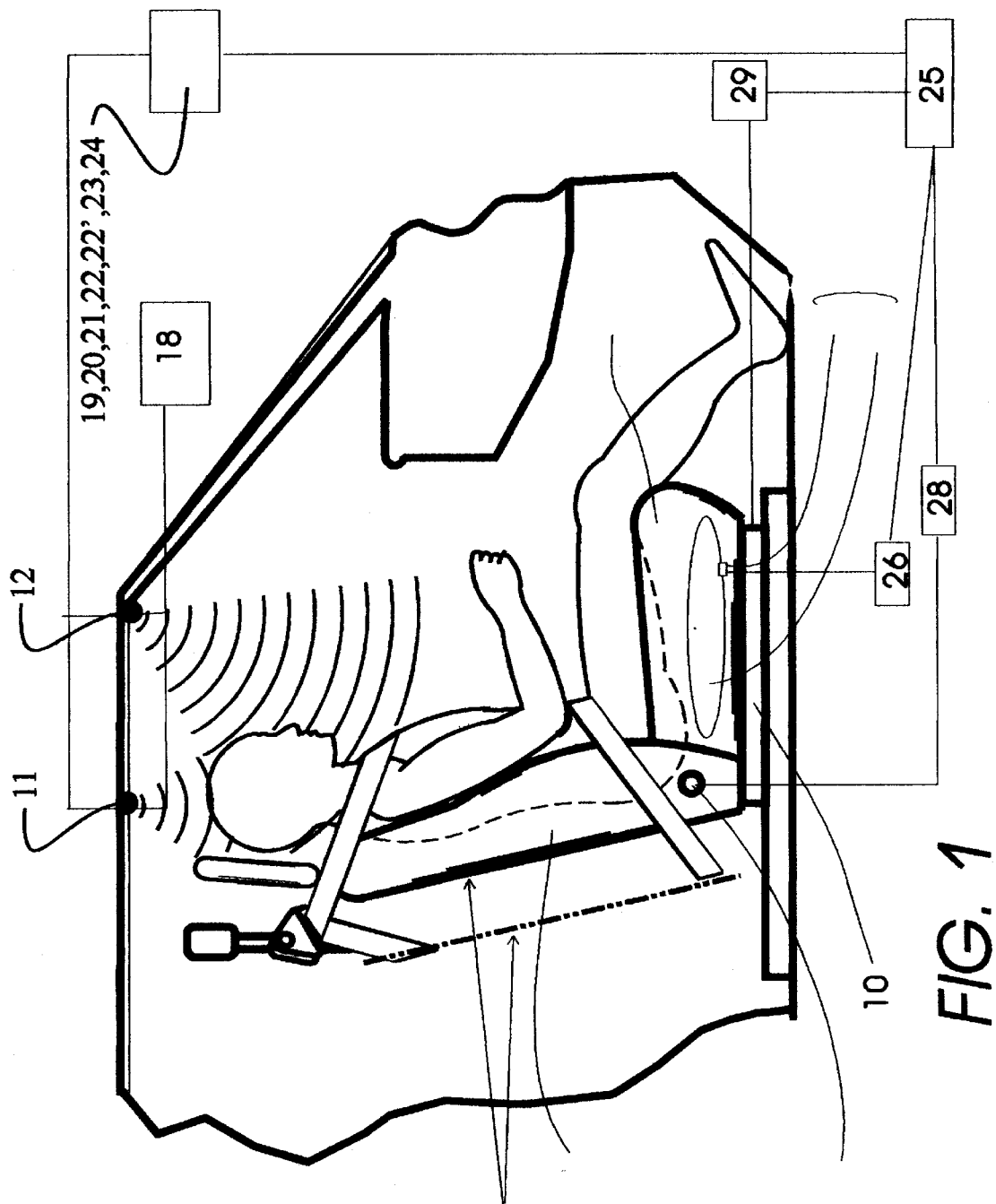
FIG. 1 shows a seated-state detecting unit in accordance with the present invention and the connections between ultrasonic or electromagnetic sensors, a weight sensor, a reclining angle detecting sensor, a seat track position detecting sensor, a neural network circuit, and an airbag system installed within a vehicle compartment.

Referring to the accompanying drawings wherein like reference numbers designate the same or similar elements, FIG. 1 shows a passenger seat 1 to which an adjustment apparatus including a seated-state detecting unit according to the present invention may be applied. The seat 1 includes a horizontally situated bottom seat portion 2 and a vertically oriented back portion 3. The seat portion 2 is provided with one or more weight sensors 6 that determine the weight of the object occupying the seat. The coupled portion between the seated portion 2 and the back portion 3 is provided with a reclining angle detecting sensor 9, which detects the tilted angle of the back portion 3 relative to the seat portion 2. The seat portion 2 is provided with a seat track position-detecting sensor 10. The seat track position detecting sensor 10 fulfills a role of detecting the quantity of movement of the seat 1 which is moved from a back reference position, indicated by the dotted chain line. The seat 1 may be the driver seat, the front passenger seat or any other seat in a motor vehicle as well as other seats in transportation vehicles or seats in nontransportation applications.

Weight measuring means such as the sensor 6 are associated with the seat, e.g., mounted into or below the seat portion 2, for measuring the weight applied onto the seat. The weight may be zero if no occupying item is present. Sensor 6 may represent a plurality of different sensors which measure the weight applied onto the seat at different portions thereof or for redundancy purposes, e.g., such as by means of an airbag 5 in the seat portion 2. Such sensors may be in the form of force or pressure sensors which measure the force or pressure on the seat or seat back, displacement measuring sensors which measure the displacement of the seat surface or the entire seat such as through the use of strain gages mounted on the seat structural members or other appropriate locations, or systems which convert displacement into a pressure wherein a pressure sensor can be used as a measure of weight.

Figure 2:
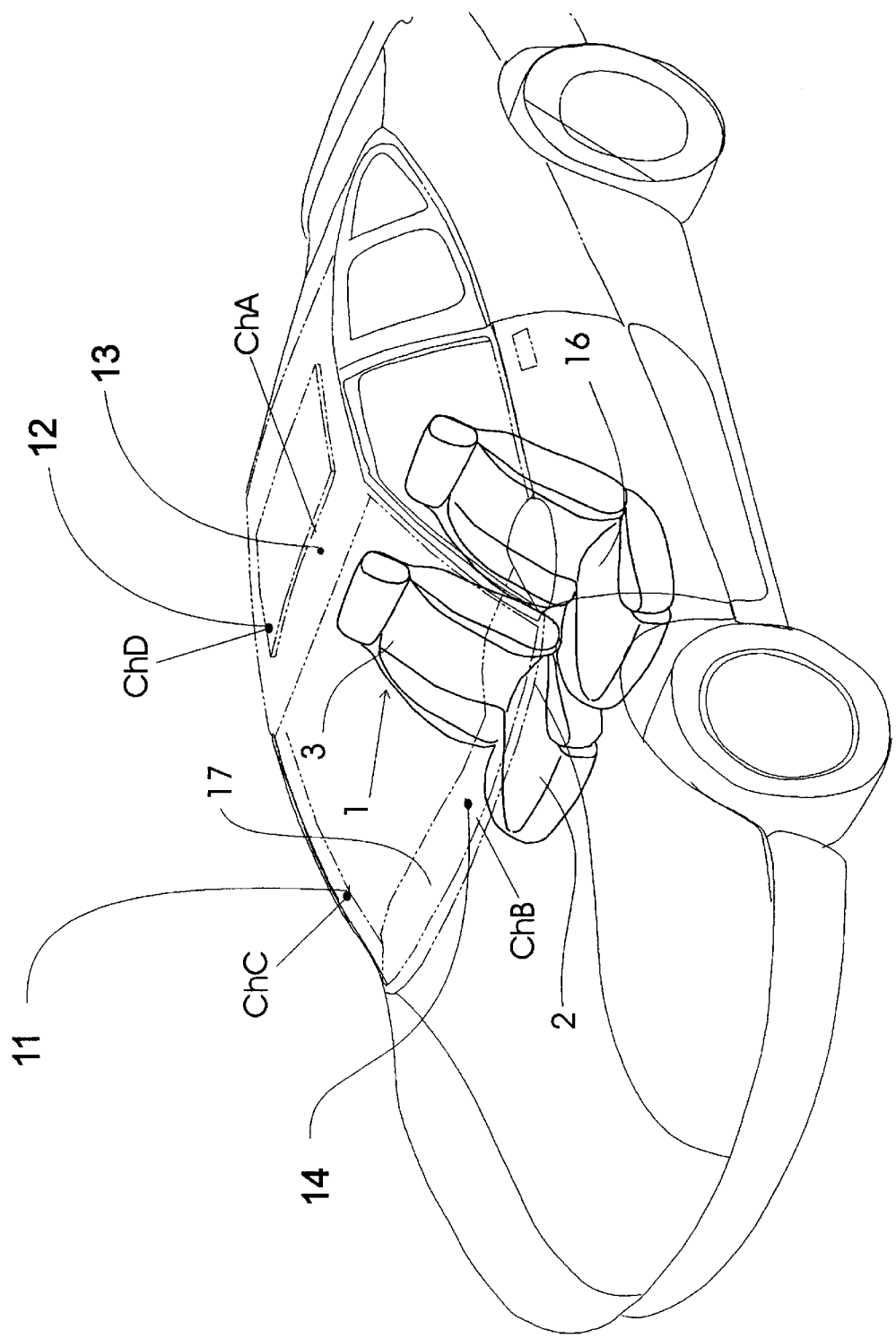
FIG. 2 is a view of a passenger seat in the compartment showing the relative layout of the ultrasonic or electromagnetic sensors.

As shown in FIG. 2, there are provided four sets of wave-receiving sensor systems 11–14 mounted within the passenger compartment. Each set of sensor systems 11–14 comprises a transmitter and a receiver, which may be integrated into a single unit or individual components separated from one another. In this embodiment, the sensor system 11 is mounted on the upper portion of the front pillar, A-Pillar, of the vehicle. The sensor system 12 is mounted on the upper portion of the intermediate pillar, B-Pillar. The sensor system 13 is mounted on the roof ceiling portion or the headliner (FIG. 2). The sensor system 14 is mounted near the middle of an instrument panel 17 in front of the driver's seat 16 (FIG. 2). The sensor systems are preferably ultrasonic or electromagnetic. Although sensor systems 11–14 are described as being ultrasonic or electromagnetic sensors, the invention is equally applicable for other types of sensors (other than ultrasonic or electromagnetic) which will detect the presence of an occupant from a distance including Capacitive sensors. Also, if the sensor systems 11–14 are passive infrared sensors, then they may only comprise a wave-receiver.

Figure 3:
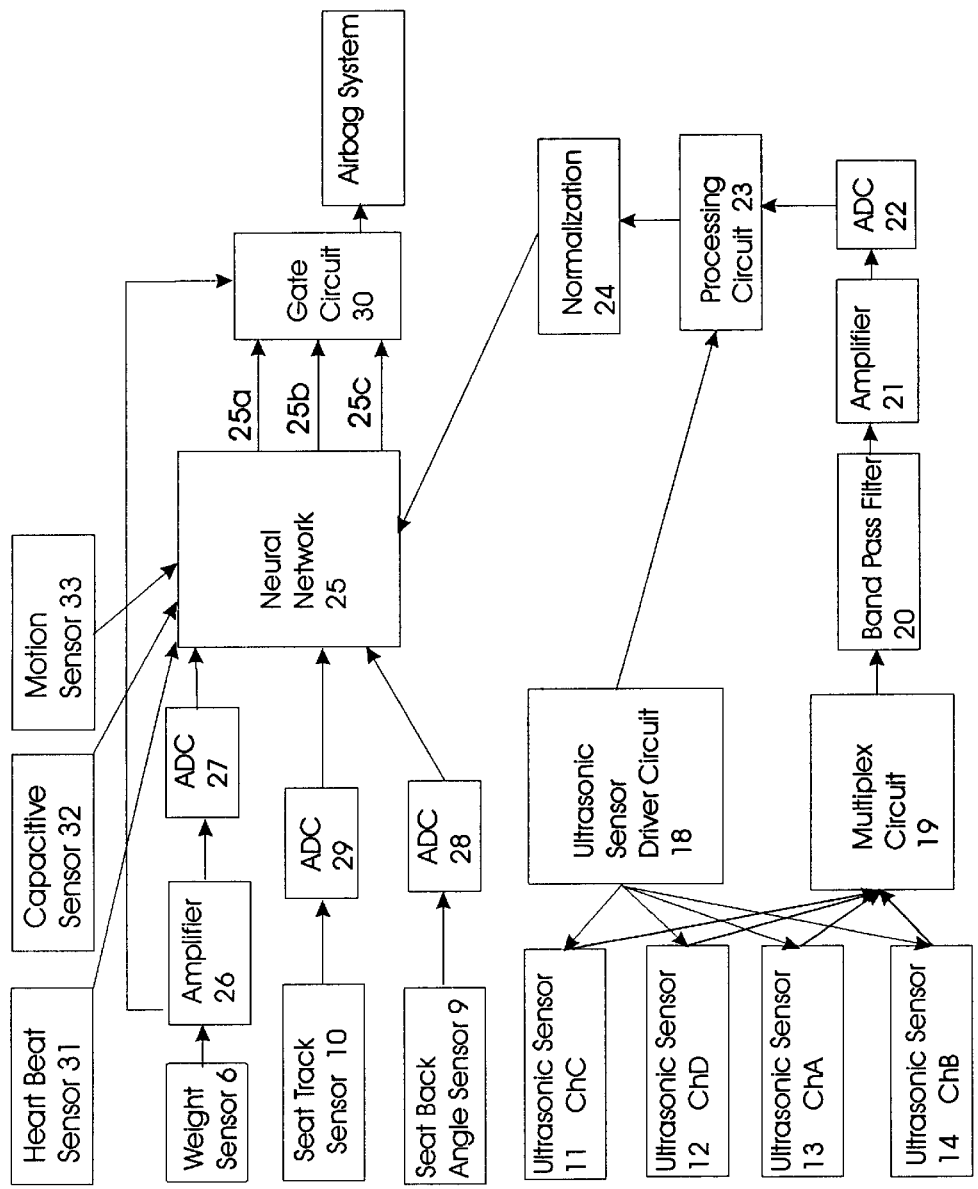
FIG. 3 is a circuit diagram of the seated-state detecting unit of the present invention.

The ultrasonic or electromagnetic sensor systems 11–14 are controlled or driven, one at a time or simultaneously, by an appropriate driver circuit such as ultrasonic or electromagnetic sensor driver circuit 18 shown in FIG. 3. The transmitters of the ultrasonic or electromagnetic sensor systems 11–14 transmit respective ultrasonic or electromagnetic waves toward the seat 1 and transmit pulses (see FIG. 4(c)) in sequence at times t1, t2, t3 and t4 (t4>t3>t2>t1 or simultaneously t1=t2=t3=t4). The reflected waves of the ultrasonic or electromagnetic waves are received by the receivers ChA–ChD of the ultrasonic or electromagnetic sensors 11–14. The receiver ChA is associated with the ultrasonic or electromagnetic sensor system 13, the receiver ChB is associated with the ultrasonic or electromagnetic sensor system 14, the receiver ChD is associated with the ultrasonic or electromagnetic sensor system 11, and the receiver ChD is associated with the ultrasonic or electromagnetic sensor system 12.

Figure 4:
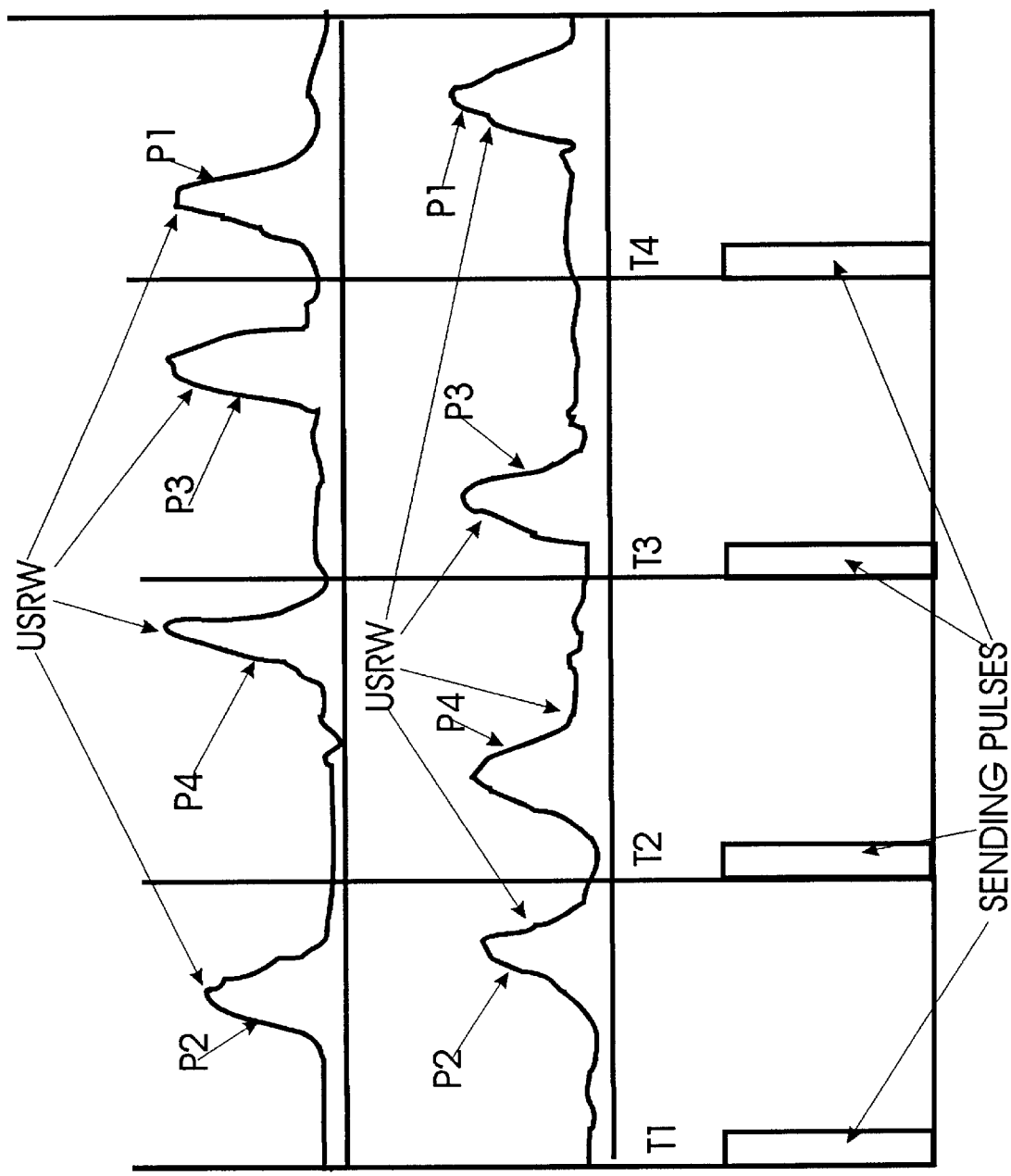
FIGS. 4(a), 4(b) and 4(c) are each a diagram showing the configuration of the reflected waves of an ultrasonic wave transmitted from each transmitter of the ultrasonic sensors toward the passenger seat, obtained within the time that the reflected wave arrives at a receiver, FIG. 4(a) showing an example of the reflected waves obtained when a passenger is in a normal seated-state, FIG. 4(b) showing an example of the reflected waves obtained when a passenger is in an abnormal seated-state (where the passenger is seated too close to the instrument panel), and FIG. 4(c) showing a transmit pulse.

The following discussion will apply to the case where ultrasonic sensors are used although a similar discussion can be presented relative to the use of electromagnetic sensors such as active infrared sensors, taking into account the differences in the technologies. Also, the following discussion will relate to an embodiment wherein the seat 1 is the front passenger seat. FIGS. 4(a) and 4(b) show examples of the reflected ultrasonic waves USRW that are received by receivers ChA–ChD. FIG. 4(a) shows an example of the reflected wave USRW that is obtained when an adult sits in a normally seated space on the passenger seat 1, while FIG. 4(b) shows an example of the reflected wave USRW that are obtained when an adult sits in a slouching state (one of the abnormal seated-states) in the passenger seat 1.

In the case of a normally seated passenger, as shown in FIG. 2, the location of the ultrasonic sensor system 12 is closest to the passenger A. Therefore, the reflected wave pulse P1 is received earliest after transmission by the receiver ChD as shown in FIG. 4(a), and the width of the reflected wave pulse P1 is larger. Next, the distance from the ultrasonic sensor 13 is closer to the passenger A, so a reflected wave pulse P2 is received earlier by the receiver ChA compared with the remaining reflected wave pulses P3 and P4. Since the reflected wave pauses P3 and P4 take more time than the reflected wave pulses P1 and P2 to arrive at the receivers ChC and ChB, the reflected wave pulses P3 and P4 are received as the timings shown in FIG. 4(a). More specifically, since it is believed that the distance from the ultrasonic sensor system 11 to the passenger A is slightly shorter than the distance from the ultrasonic sensor system 14 to the passenger A, the reflected wave pulse P3 is received slightly earlier by the receiver ChC than the reflected wave pulse P4 is received by the receiver ChB.

In the case where the passenger A is sitting in a slouching state in the passenger seat 1, the distance between the ultrasonic sensor system 11 and the passenger A is shortest. Therefore, the time from transmission at time t3 to reception is shortest, and the reflected wave pulse P3 is received by the receiver ChC, as shown in FIG. 4(b). Next, the distances between the ultrasonic sensor system 14 and the passenger A becomes shorter, so the reflected wave pulse P4 is received earlier by the receiver ChB than the remaining reflected wave pulses P2 and P1. When the distance from the ultrasonic sensor system 13 to the passenger A is compared with that from the ultrasonic sensor system 12 to the passenger A, the distance from the ultrasonic sensor system 13 to the passenger A becomes shorter, so the reflected wave pulse P2 is received by the receiver ChA first and the reflected wave pulse P1 is thus received last by the receiver ChD.

The configurations of the reflected wave pulses P1–P4, the times that the reflected wave pulses P1–P4 are received, the sizes of the reflected wave pulses P1–P4 are varied depending upon the configuration and position of an object such as a passenger situated on the front passenger seat 1. FIGS. 4(a) and (b) merely show examples for the purpose of description and therefore it is a matter of course that the present invention is not limited to these examples.

The outputs of the receivers ChA–ChD, as shown in FIG. 3, are input to a band pass filter 20 through a multiplex circuit 19 which is switched in synchronization with a timing signal from the ultrasonic sensor drive circuit 18. The band pass filter 20 removes a low frequency wave component from the output signal based on each of the reflected wave USRW and also removes some of the noise. The output signal based on each of the reflected wave USRW is passed through the band pass filter 20, then is amplified by an amplifier 21. The amplifier also removes the high frequency carrier wave component in each of the reflected USRW and generates an envelope wave signal. This envelope wave signal is input to an analog/digital converter (ADC) 22 and digitized as measured data. The measured data is input to a processing circuit 23, which is controlled by the timing signal which is in turn output from the ultrasonic sensor drive circuit 18.

The processing circuit 23 collects measured data at intervals of 7 ms, and 47 data points are generated for each of the ultrasonic sensor systems 11–14. For each of these reflected waves USRW, the initial reflected wave portion T1 and the last reflected wave portion T2 are cut off. The reason for this will be described when the training procedure of a neural network circuit is described later, and the description is omitted for now. With this, 32 data points, 31 data points, 37 data points, and 38 data points will be sampled by the ultrasonic sensor systems 11, 12, 13 and 14, respectively. The reason why the number of data points differs for each of the ultrasonic sensor systems 11–14 is that the distance from the passenger seat 1 to the ultrasonic sensor systems 11–14 differ from one another.

Each of the measured data is input to a normalization circuit 24 and normalized. The normalized measured data is input to the neural network circuit 25 as wave data.

The output of the weight sensor(s) 6 is amplified by an amplifier 26 coupled to the weight sensor(s) 6 and the amplified output is input to the analog/digital converter 27.

The reclining angle detecting sensor 9 and the seat track position-detecting sensor 10, which each may comprise a variable resistor, are connected to constant-current circuits, respectively. A constant-current is supplied from the constant-current circuit to the reclining angle detecting sensor 9, and the reclining angle detecting sensor 9 converts a change in the resistance value on the tilt of the back portion 3 to a specific voltage. This output voltage is input to an analog/digital converter 28 as angle data, i.e., representative of the angle between the back portion 3 and the seat portion 2. Similarly, a constant current is supplied from the constant-current circuit to the seat track position detecting sensor 10 and the seat track position detecting sensor 10 converts a change in the resistance value based on the track position of the seat portion 2 to a specific voltage. This output voltage is input to an analog/digital converter 29 as seat track data. Thus, the outputs of the reclining angle-detecting sensor 9 and the seat track position-detecting sensor 10 are input to the analog/digital converters 28 and 29, respectively. Each digital data value from the ADCs 28,29 is input to the neural network circuit 25. Although the digitized data of the weight sensor(s) 6 is input to the neural network circuit 25, the output of the amplifier 26 is also input to a comparison circuit. The comparison circuit, which is incorporated in the gate circuit algorithm, determines whether or not the weight of an object on the passenger seat 1 is more than a predetermined weight, such as 60 lbs., for example. When the weight is more than 60 lbs., the comparison circuit outputs a logic 1 to the gate circuit to be described later. When the weight of the object is less than 60 lbs., a logic 0 is output to the gate circuit.

A heartbeat sensor 31 is arranged to detect a heart beat, and the magnitude thereof, of a human occupant of the seat, if such a human occupant is present. The output of the heart beat sensor 31 is input to the neural network circuit 25. The heartbeat sensor 31 may be of the type as disclosed in McEwan (U.S. Pat. Nos. 5,573,012 and 5,766,208 which are included herein in their entirety by reference). The heartbeat sensor 31 can be positioned at any convenient position relative the seat 1 where occupancy is being monitored. A preferred location is within the vehicle seatback.

A capacitive sensor 32 is arranged to detect the presence of an occupying item on the seat 1 and the output thereof is input to the neural network circuit 25. Capacitor sensors appropriate for this function are disclosed in Kithil (U.S. Pat. No. 5,602,734 which is included herein by reference). Capacitive sensors can in general be mounted at locations 11–14 in FIG. 2.

A motion sensor 33 is arranged to detect motion of an occupying item on the seat 1 and the output thereof is input to the neural network circuit 25. Motion sensors can utilize a micro-power impulse radar (MIR) system as disclosed, for example, in McEwan (U.S. Pat. No. 5,361,070, which is included herein by reference), as well as many other patents by the same inventor. Motion sensing is accomplished by monitoring a particular range from the sensor as disclosed in that patent. MIR is one form of radar which has applicability to occupant sensing and can be mounted at locations such as 11–14 in FIG. 2. It has an advantage over ultrasonic sensors in that data can be acquired at a higher speed and thus the motion of an occupant can be more easily tracked. The ability to obtain return signals over the entire occupancy range is somewhat more difficult than with ultrasound resulting in a more expensive system overall. MIR has additional advantages in lack of sensitivity to temperature variation and has a comparable resolution to about 40 kHz ultrasound. Resolution comparable to higher frequency is feasible but has not been demonstrated. Additionally, multiple MIR sensors can be used when high speed tracking of the motion of an occupant during a crash is required since they can be individually pulsed without interfering with each through time division multiplexing.

The neural network circuit 25 recognizes the seated-state of a passenger A by training as described in several books on Neural Networks referenced in the above referenced patents and patent applications. Then, after training the seated-state of the passenger A and developing the neural network weights, the system is tested. The training procedure and the test procedure of the neural network circuit 25 will hereafter be described with a flowchart shown in FIG. 6.

Figure 6:
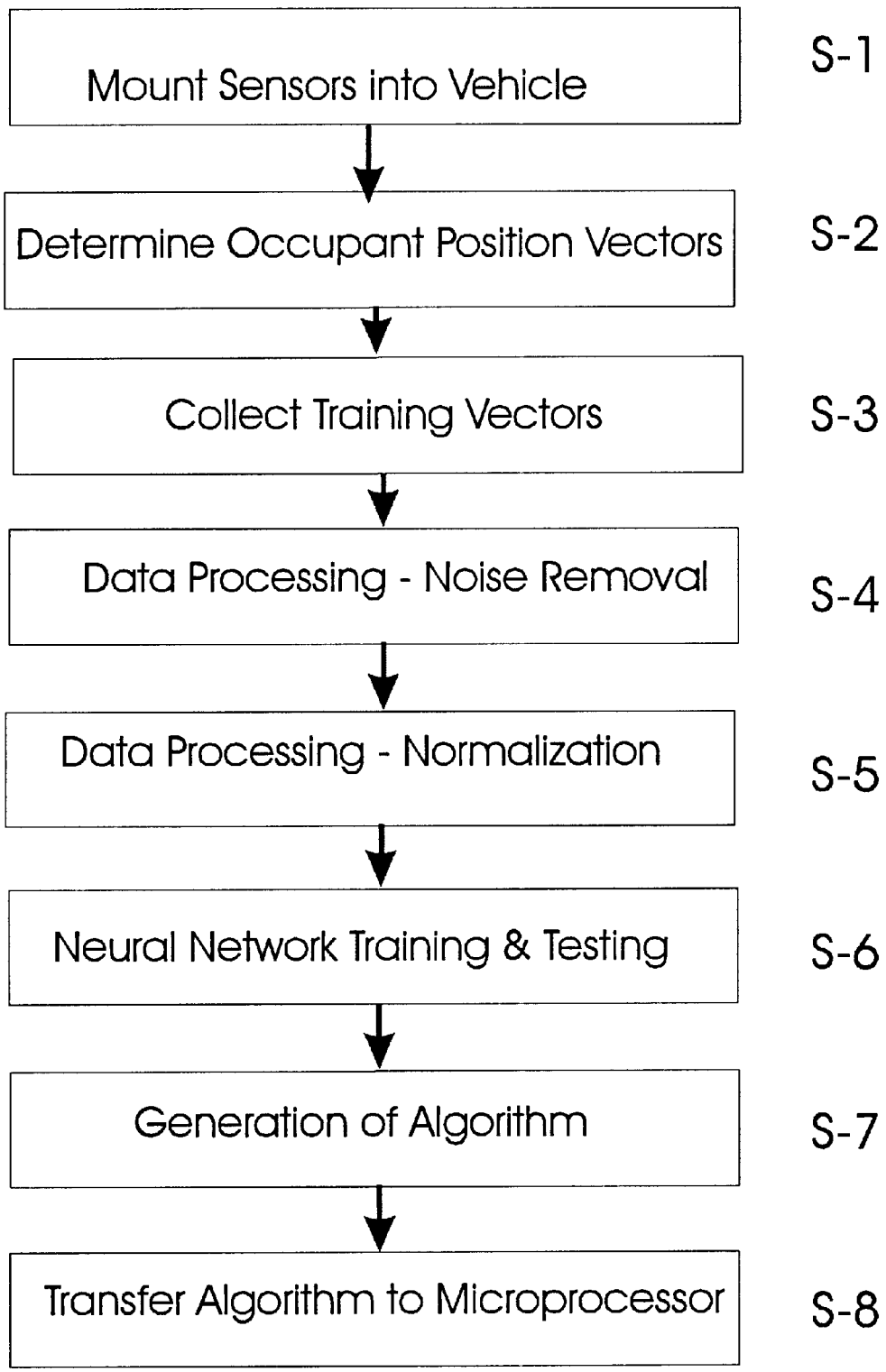
FIG. 6 is a flowchart showing the training steps of a neural network circuit.

As diagrammed in FIG. 6, the first step is to mount the four sets of ultrasonic sensor systems 11–14, the weight sensor 6, the reclining angle detecting sensor 9, and the seat track position detecting sensor 10 into a vehicle (step S 1). Next, in order to provide data for the neural network circuit 25 to learn the patterns of seated states, data is recorded for patterns of all possible seated states and a list is maintained recording the seated states for which data was acquired. The data from the sensors/transducers 6, 9–14 and 31–33, for a particular occupancy of the passenger seat is called a vector (step S 2). It should be pointed out that the use of the reclining angle detecting sensor 9, seat track position detecting sensor 10, heart beat sensor 31, capacitive sensor 32 and motion sensor 33 are not essential to the detecting apparatus and method in accordance with the invention. However, each of these sensors, in combination with any one or more of the other sensors would likely enhance the evaluation of the seated-state of the seat.

For the vectors of data, adults and children each with different postures, states of windows etc. within the passenger compartment, and occupied and unoccupied child seats were selected. The selected adults include people with a variety of different physiques such as fat, lean, small, large, tall, short, and glasses wearing persons. The selected children ranged from an infant to a large child (for example, about 14 year old). In addition, the selected postures include, for example, a sitting state with legs crossed on a seat, a sitting state with legs on an instrument panel, a sitting state while reading a newspaper, a book, or a map, a sitting state while holding a cup of coffee, a cellular telephone or a dictation machine, and a slouching state with and without raised knees. Furthermore, the selected compartment states include variations in the seat track position, the window-opening amount, headrest position, and varying positions of a sun-visor. Moreover, a multitude of different models of child seats are used in the forward facing position and, where appropriate, in a rear facing position. The range of weights and the corresponding normalized values are as follows:

| Class | Weight Range | Normalized Value |
|---|---|---|
| Empty seat | 0 to 2.2 lbs. | 0 to 0.01 |
| Rear Facing Child Seat | 2.2 to 60 lbs. | 0.01 to 0.27 |
| Forward facing Child Seat | 2.2 to 60 lbs. | 0.01 to 0.27 |
| Normal Position Adult | 60 lbs and greater | 0.27 to 1 |

Obviously, other weight ranges may also be used in accordance with the invention and each weight range may be tailored to specific conditions, such as different vehicles.

Various vehicle setups were prepared by a combination of these variations and, for in this embodiment, almost 500,000 or more vectors should be prepared for the patterns to be used as data for the neural network training.

Figure 5:
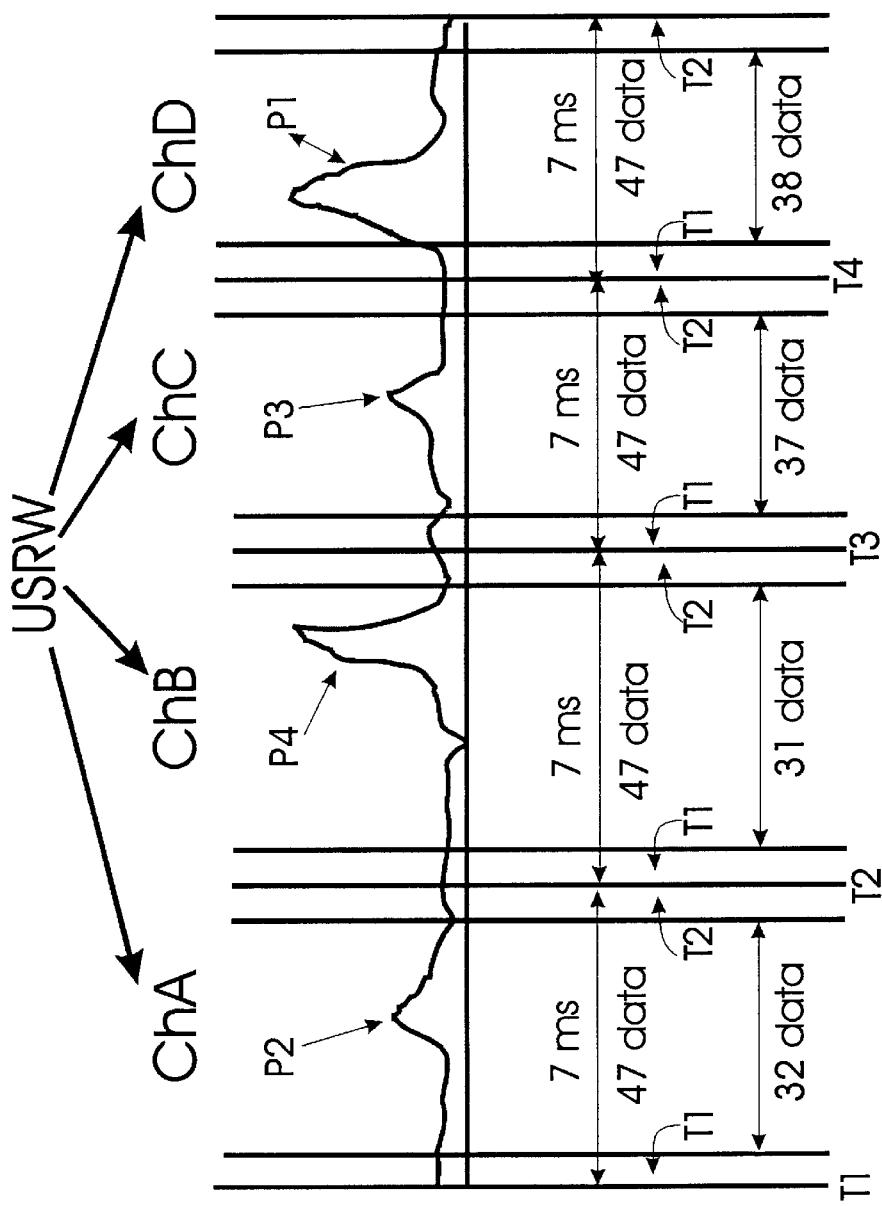
FIG. 5 is a diagram of the data processing of the reflected waves from the ultrasonic or electromagnetic sensors.

Next, based on the training data from the reflected waves of the ultrasonic sensor systems 11–14 and the other sensors 6, 31–33, the vector data is collected (step S 3). Next, the reflected waves P1–P4 are modified by removing the initial reflected waves with a short reflection time from an object (period T1 in FIG. 5) and the last portion of the reflected waves with a long reflection time from an object (period P2 in FIG. 5) (step S 4). It is believed that the reflected waves with a short reflection time from an object is a due to cross-talk, that is, waves from the transmitters which leaks into each of their associated receivers ChA–ChD. It is also believed that the reflected waves with a long reflection time are reflected waves from an object far away from the passenger seat or from multipath reflections. If these two reflected wave portions are used as data, they will add noise to the training process. Therefore, these reflected wave portions are eliminated from the data.

Figure 7:
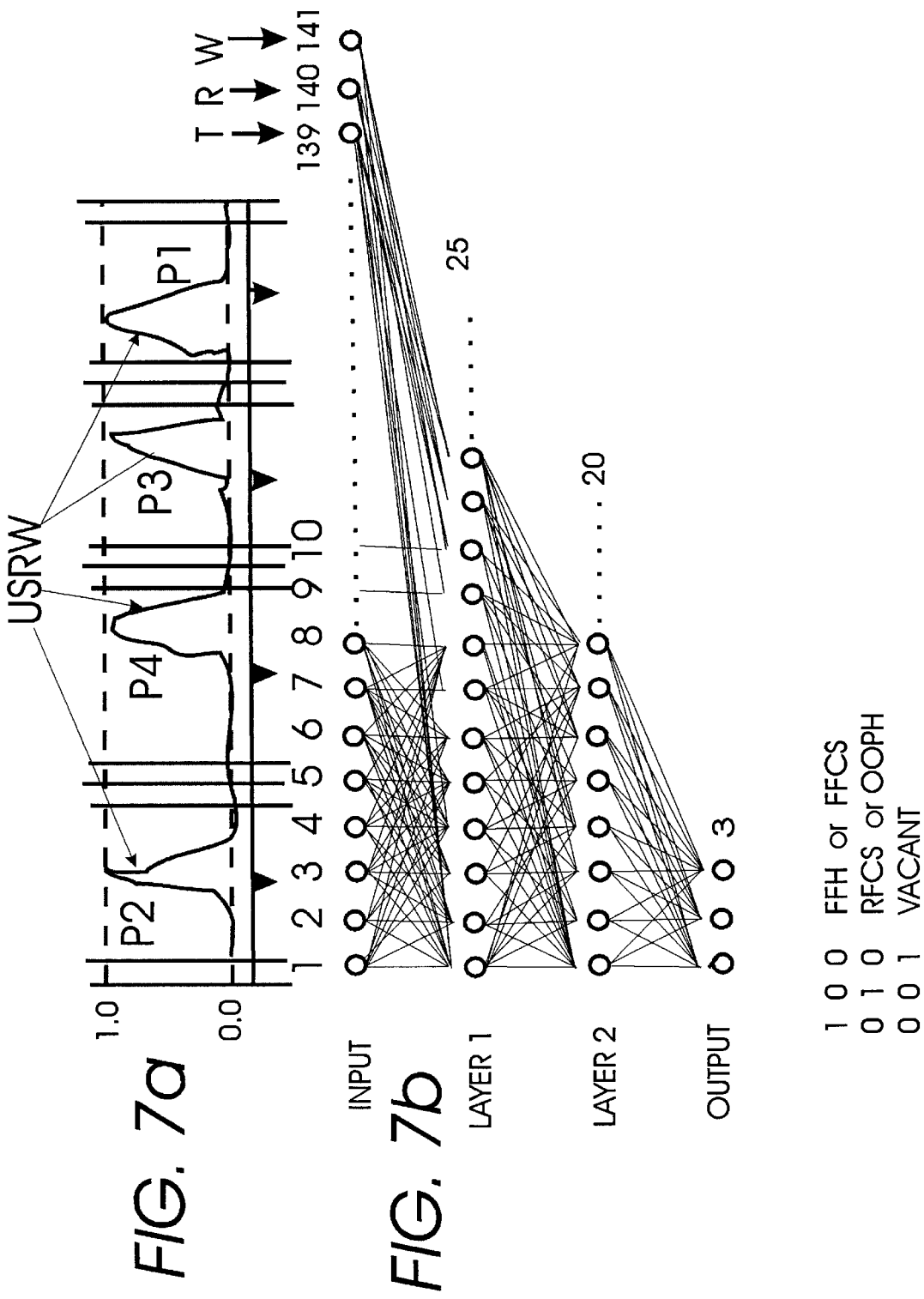
FIG. 7(a) is an explanatory diagram of a process for normalizing the reflected wave and shows normalized reflected waves.
FIG. 7(b) is a diagram similar to FIG. 7(a) showing a step of extracting data based on the normalized reflected waves and a step of weighting the extracted data by employing the data of the seat track position detecting sensor, the data of the reclining angle detecting sensor, and the data of the weight sensor.

As shown in FIG. 7(a), measured data is normalized by making the peaks of the reflected wave pulses P1–P4 equal (step S 5). This eliminates the effects of different reflectivities of different objects and people depending on the characteristics of their surfaces such as their clothing Data from the weight sensor, seat track position sensor and seat reclining angle sensor are also normalized based typically on fixed normalization parameters.

Therefore, the normalized data from the ultrasonic transducers the seat track position detecting sensor 10, the reclining angle detecting sensor 9, from the weight sensor(s) 6, from the heart beat sensor 31, the capacitive sensor 32 and the motion sensor 33 are input to the neural network circuit 25, and the neural network circuit 25 is then trained on this data. More specifically, the neural network circuit 25 adds up the normalized data from the ultrasonic transducers, from the seat track position detecting sensor 10, from the reclining angle detecting sensor 9, from the weight sensor(s) 6, from the heart beat sensor 31, from the capacitive sensor 32 and from the motion sensor 33 with each data point multiplied by a associated weight according to the conventional neural network process to determine correlation function (step S 6).

In this embodiment, 144 data points are appropriately interconnected at 25 connecting points of layer 1, and each data point is mutually correlated through the neural network training and weight determination process. The 144 data points consist of 138 measured data points from the ultrasonic transducers, the data (139th) from the seat track position detecting sensor 10, the data (140th) from the reclining angle detecting sensor 9, the data (141st) from the weight sensor(s) 6, the data ($142^{nd}$) from the heart beat sensor 31, the data ($143^{rd}$) from the capacitive sensor and the data ($144^{th}$) from the motion sensor. Each of the connecting points of the layer 1 has an appropriate threshold value, and if the sum of measured data exceeds the threshold value, each of the connecting points will output a signal to the connecting points of layer 2.

The connecting points of the layer 2 comprises 20 points, and the 25 connecting points of the layer 1 are appropriately interconnected as the connecting points of the layer 2. Similarly, each data is mutually correlated through the training process and weight determination as described above and in the above referenced neural network texts. Each of the 20 connecting points of the layer 2 has an appropriate threshold value, and if the sum of measured data exceeds the threshold value, each of the connecting points will output a signal to the connecting points of layer 3.

The connecting points of the layer 3 comprises 3 points, and the connecting points of the layer 2 are interconnected at the connecting points of the layer 3 so that each data is mutually correlated as described above. If the sum of the outputs of the connecting points of layer 2 exceeds a threshold value, the connecting points of the latter 3 will output Logic values (100), (010), and (001) respectively.

The threshold value of each connecting point is determined by multiplying weight coefficients and summing up the results in sequence, and the aforementioned training process is to determine a weight coefficient Wj so that the threshold value (ai) is a previously determined output.

$$ai = \Sigma Wj \cdot Xj (j=1 \text{ to } N)$$

wherein Wj is the weight coefficient,

Xj is the data and

N is the number of samples.

Based on this result of the training, the neural network circuit 25 generates the weights for the coefficients of the correlation function or the algorithm (step S 7).

At the time the neural network circuit 25 has learned a suitable number of patterns of the training data, the result of the training is tested by the test data. In the case where the rate of correct answers of the seated-state detecting unit based on this test data is unsatisfactory, the neural network circuit is further trained and the test is repeated. In this embodiment, the test was performed based on about 600,000 test patterns. When the rate of correct test result answers was at about 98%, the training was ended.

The neural network circuit 25 has outputs 25a, 25b and 25c. Each of the outputs 25a, 25b and 25c outputs a signal of logic 0 or 1 to a gate circuit or algorithm 30. Based on the signals from the outputs 25a, 25b and 25c, any one of these combination (100), (010) and (001) is obtained. In another preferred embodiment, all data for the empty seat was removed from the training set and the empty seat case was determined based on the output of the weight sensor alone. This simplifies the neural network and improves its accuracy.

In this embodiment, the output (001) correspond to a vacant seat, a seat occupied by an inanimate object or a seat occupied by a pet (VACANT), the output (010) corresponds to a rear facing child seat (RFCS) or an abnormally seated passenger (ASP), and the output (100) corresponds to a normally seated passenger (NSP) or a forward facing child seat (FFCS).

The gate circuit (seated-state evaluation circuit) 30 can be implemented by an electronic circuit or by a computer algorithm by those skilled in the art and the details will not be presented here. The function of the gate circuit 30 is to remove the ambiguity that sometimes results when ultrasonic sensors and seat position sensors alone are used. This ambiguity is that it is sometimes difficult to differentiate between a rear facing child seat (RFCS) and an abnormally seated passenger (ASP), or between a normally seated passenger (NSP) and a forward facing child seat (FFCS). By the addition of one or more weight sensors in the function of acting as a switch when the weight is above or below 60 lbs., it has been found that this ambiguity can be eliminated. The gate circuit therefore takes into account the output of the neural network and also the weight from the weight sensor (s) as being above or below 60 lbs. and thereby separates the two cases just described and results in five discrete outputs.

Thus, the gate circuit 30 fulfills a role of outputting five kinds of seated-state evaluation signals, based on a combination of three kinds of evaluation signals from the neural network 25 and superimposed information from the weight sensor(s). The five seated-state evaluation signals are input to an airbag deployment determining circuit that is part of the airbag system and will not be described here. Naturally, as disclosed in the above reference patents and patent applications, the output of this system can also be used to activate a variety of lights or alarms to indicate to the operator of the vehicle the seated state of the passenger. Naturally, the system that has been here described for the passenger side is also applicable for the most part for the driver side.

In this embodiment, although the neural network circuit 25 has been employed as an evaluation circuit, the mapping data of the coefficients of a correlation function may also be implemented or transferred to a microcomputer to constitute the valuation circuit (see Step S 8 in FIG. 6).

According to the seated-state detecting unit of the present invention, the identification of a vacant seat (VACANT), a rear facing child seat (RFCS), a forward facing child seat (FFCS), a normally seated adult passenger (NSP), an abnormally seated adult passenger (ASP), can be reliably performed. Based on this identification, it is possible to control a component, system or subsystem in the vehicle. For example, a regulation valve which controls the inflation or deflation of an airbag may be controlled based on the evaluated identification of the occupant of the seat. This regulation valve may be of the digital or analog type. A digital regulation valve is one that is in either of two states, open or closed. The control of the flow is then accomplished by varying the time that the valve is open and closed, i.e., the duty cycle.

Moreover, the seated-state detecting unit described above may be used in a component adjustment system and method described below when the presence of a human being occupying the seat is detected.

The component adjustment system and methods in accordance with the invention automatically and passively adjust the component based on the morphology of the occupant of the seat. As noted above, the adjustment system may include the seated-state detecting unit described above so that it will be activated if the seated-state detecting unit detects that an adult or child occupant is seated on the seat, i.e., the adjustment system will not operate if the seat is occupied by a child seat, pet or inanimate objects. Obviously, the same system can be used for any seat in the vehicle including the driver seat and the passenger seat(s). This adjustment system may incorporated the same components as the seated-state detecting unit described above, i.e., the same components may constitute a part of both the seated-state detecting unit and the adjustment system, e.g., the weight measuring means.

The adjustment system described herein, although improved over the prior art, will at best be approximate since two people, even if they are identical in all other respects, may have a different preferred driving position or other preferred adjusted component location or orientation. A system that automatically adjusts the component, therefore, must learn from its errors. Thus, when a new occupant sits in the vehicle, for example, the system automatically estimates the best location of the component for that occupant and moves the component to that location, assuming it is not already at the best location. If the occupant changes the location, the system must remember that change and incorporate it into the adjustment the next time that person enters the vehicle and is seated in the same seat. Therefore, the system need not make a perfect selection the first time but it must remember the person and the position the component was in for that person. The system, therefore, makes one, two or three measurements of morphological characteristics of the occupant and then adjusts the component based on an algorithm. The occupant will correct the adjustment and the next time that the system measures the same measurements for those measurement characteristics, it will set the component to the corrected position. As such, preferred components for which the system in accordance with the invention is most useful are those which affect a driver of the vehicle and relate to the sensory abilities of the driver, i.e., the mirrors, the seat, the steering wheel and steering column and accelerator, clutch and brake pedals.

The first characteristic used is a measurement of the height of the occupant from the vehicle seat. This can be done by a sensor in the ceiling of the vehicle but this becomes difficult since, even for the same seat location, the head of the occupant will not be at the same angle with respect to the seat and therefore the angle to a ceiling-mounted sensor is in general unknown at least as long as only one ceiling mounted sensor is used. This problem can be solved if two or three sensors are used as described in more detail below. The simplest implementation is to place the sensor in the seat. In the '320 patent mentioned above, a rear impact occupant protection apparatus is disclosed which uses sensors mounted within the headrest. This same system can also be used to measure the height of the occupant from the seat and thus, for no additional cost assuming the rear impact occupant protection system described in the '320 patent is provided, the first measure of the occupant's morphology can be achieved. For some applications, this may be sufficient since it is unlikely that two operators will use the vehicle who have the same height. For other implementations, one or more additional measurements are used.

Figure 8:
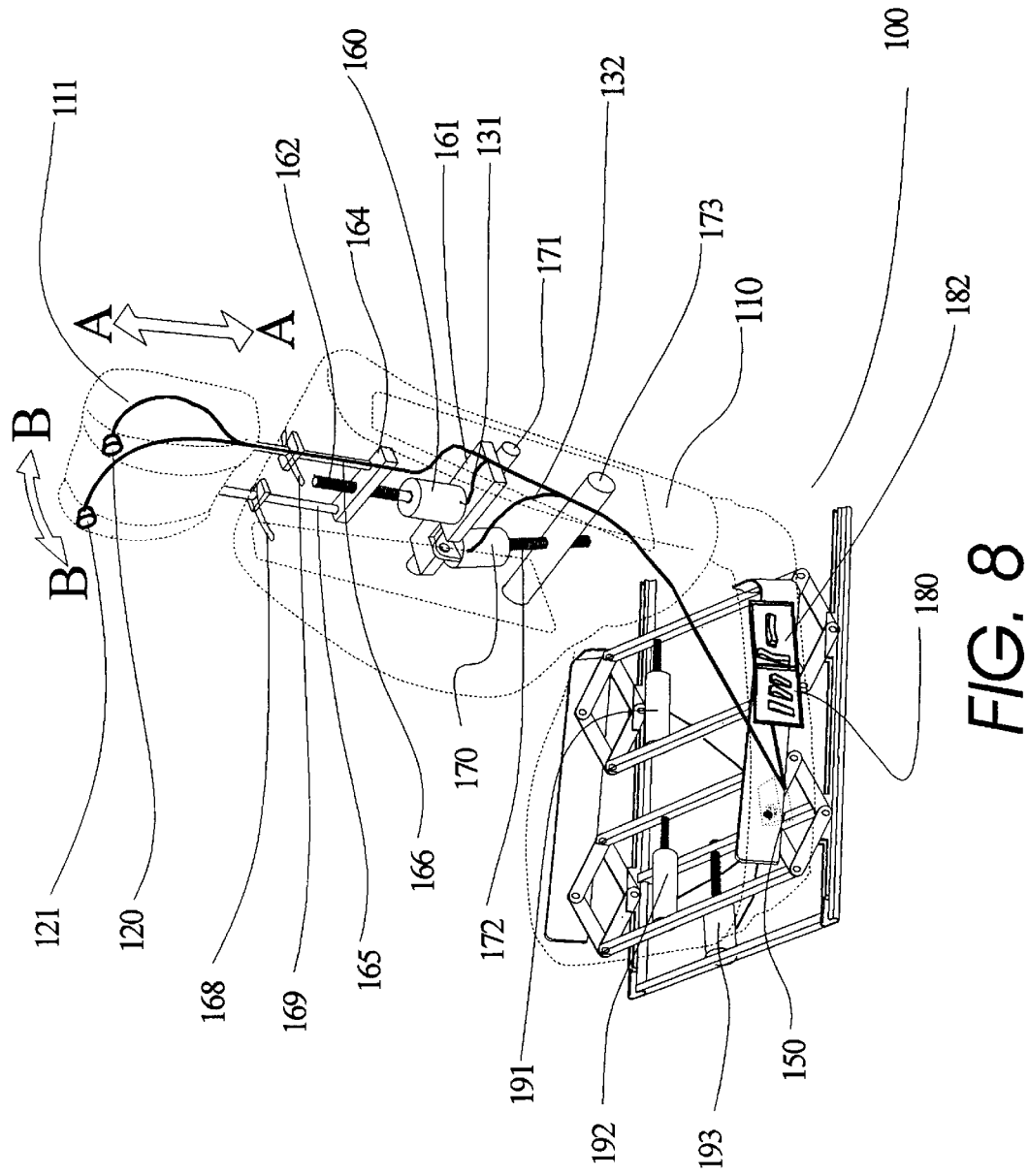
FIG. 8 is a perspective view of an automatic seat adjustment system, with the seat shown in phantom, with a movable headrest and sensors for measuring the height of the occupant from the vehicle seat showing motors for moving the seat and a control circuit connected to the sensors and motors.

Referring now to FIG. 8, an automatic adjustment system for adjusting a seat (which is being used only as an example of a vehicle component) is shown generally at 100 with a movable headrest 111 and ultrasonic sensor 120 and ultrasonic receiver 121 for measuring the height of the occupant of the seat. Power means such as motors 191, 192, and 193 connected to the seat for moving the base of the seat, control means such as a control circuit or module 150 connected to the motors and a headrest actuation mechanism using servomotors 160 and 170, which may be servomotors, are also illustrated. The seat 110 and headrest 111 are shown in phantom. Vertical motion of the headrest 111 is accomplished when a signal is sent from control module 150 to servomotor 160 through a wire 131. Servomotor 160 rotates lead screw 162 which engages with a threaded hole in member 164 causing it to move up or down depending on the direction of rotation of the lead screw 162. Headrest support rods 165 and 166 are attached to member 164 and cause the headrest 111 to translate up or down with member 164. In this manner, the vertical position of the headrest can be controlled as depicted by arrow A—A. Ultrasonic transmitter and receiver 120,121 may be replaced by other appropriate wave-generating and receiving devices, such as electromagnetic, active infrared transmitters and receivers Wire 132 leads from control module 150 to servomotor 170 which rotates lead screw 172. Lead screw 172 engages with a threaded hole in shaft 173 which is attached to supporting structures within the seat shown in phantom. The rotation of lead screw 172 rotates servo motor support 161, upon which servomotor 160 is situated, which in turn rotates headrest support rods 165 and 166 in slots 168 and 169 in the seat 110. Rotation of the servomotor support 161 is facilitated by a rod 171 upon which the servo motor support 161 is positioned. In this manner, the headrest 111 is caused to move in the fore and aft direction as depicted by arrow B—B. Naturally there are other designs which accomplish the same effect in moving the headrest up and down and fore and aft.

The operation of the system is as follows. When an adult or child occupant is seated on a seat containing the headrest and control system described above as determined by the neural network circuit 25, the ultrasonic transmitter 120 emits ultrasonic energy which reflects off of the head of the occupant and is received by receiver 121. An electronic circuit in control module 150 contains a microprocessor which determines the distance from the head of the occupant based on the time between the transmission and reception of an ultrasonic pulse. Control module 150 may be within the same microprocessor as neural network circuit 25 or separate therefrom. The headrest 111 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 110, the headrest 111 moves to find the top of the occupant's head as discussed above. This is accomplished using an algorithm and a microprocessor which is part of control circuit 150. The headrest 111 then moves to the optimum location for rear impact protection as described in the above referenced '320 patent. Once the height of the occupant has been measured, another algorithm in the microprocessor in control circuit 150 compares the occupant's measured height with a table representing the population as a whole and from this table, the appropriate positions for the seat corresponding to the occupant's height is selected. For example, if the occupant measured 33 inches from the top of the seat bottom, this might correspond to a 85% human, depending on the particular seat and statistical tables of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size, etc.

Once the proper position has been determined by control circuit 150, signals are sent to motors 191, 192, and 193 to move the seat to that position. If during some set time period after the seat has been positioned, the operator changes these adjustments, the new positions of the seat are stored in association with an occupant height class in a second table within control circuit 150. When the occupant again occupies the seat and his or her height has once again been determined, the control circuit will find an entry in the second table which takes precedence over the basic, original table and the seat returns to the adjusted position. When the occupant leaves the vehicle, or even when the engine is shut off and the door opened, the seat can be returned to a neutral position which provides for easy entry and exit from the vehicle.

The seat 110 also contains two control switch assemblies 180 and 182 for manually controlling the position of the seat 110 and headrest 111. The seat control switches 180 permit the occupant to adjust the position of the seat if he or she is dissatisfied with the position selected by the algorithm. The headrest control switches 182 permit the occupant to adjust the position of the headrest in the event that the calculated position is uncomfortably close to or far from the occupant's head. A woman with a large hairdo might find that the headrest automatically adjusts so as to contact her hairdo. This adjustment she might find annoying and could then position the headrest further from her head. For those vehicles which have a seat memory system for associating the seat position with a particular occupant, which has been assumed above, the position of the headrest relative to the occupant's head could also be recorded. Later, when the occupant enters the vehicle, and the seat automatically adjusts to the recorded preference, the headrest will similarly automatically adjust (FIG. 17B).

Figure 9:
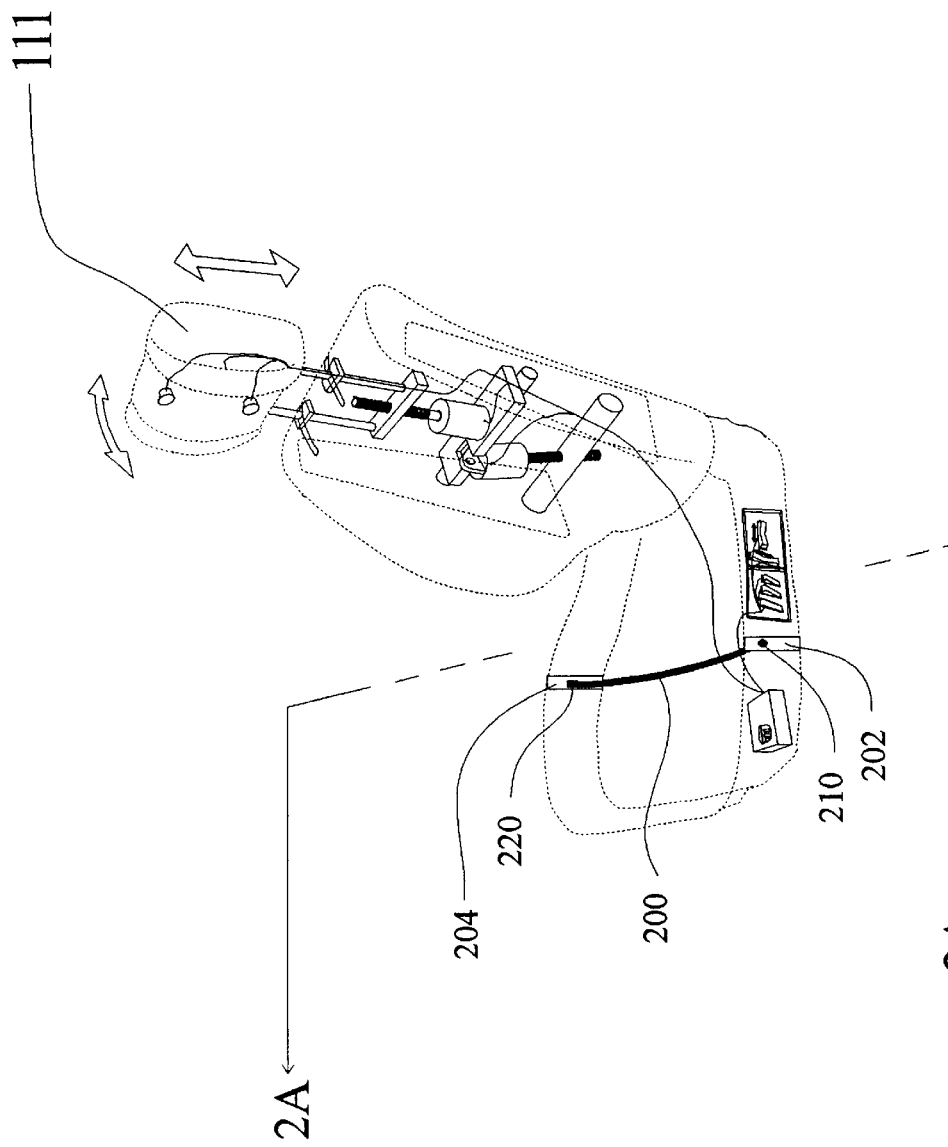
FIG. 9 is a perspective view of the seat shown in FIG. 8 with the addition of a weight sensor shown mounted onto the seat.
Figure 9A:
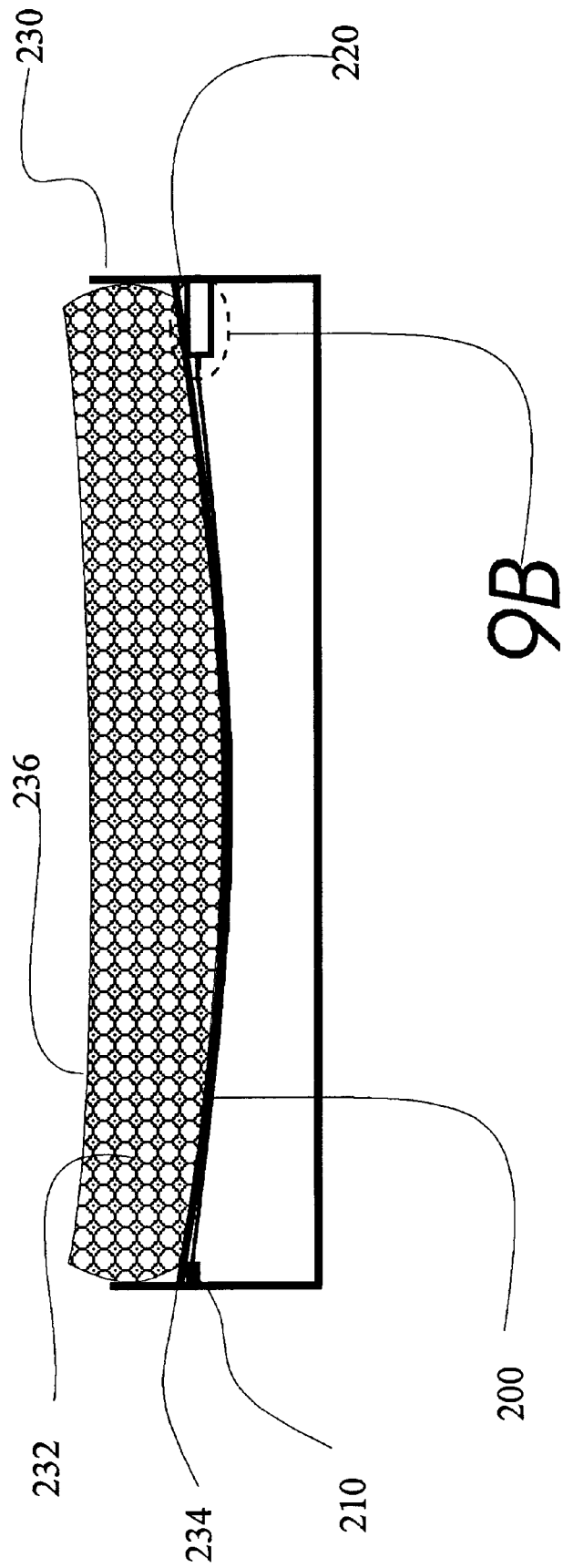
FIG. 9A is a view taken along line 9A—9A in FIG. 9.

The height of the occupant, although probably the best initial morphological characteristic, may not be sufficient especially for distinguishing one driver from another when they are approximately the same height. A second characteristic, the occupant's weight, can also be readily determined from sensors mounted within the seat in a variety of ways as shown in FIG. 9 which is a perspective view of the seat shown in FIG. 8 with a displacement or weight sensor 200 shown mounted onto the seat. Displacement sensor 200 is supported from supports 202 and 204. Referring now to FIG. 9A, which is a view of the apparatus of FIG. 9 taken along line 9A—9A, seat 230 is constructed from a foam layer 232 which is supported by a spring system 234 which is in contract with the displacement sensor 200. The displacement sensor 200 comprises an elongate cable 205 retained at one end by support 210 and a displacement sensor 220 situated at an opposite end. This displacement sensor 220 can be any of a variety of such devices including, but not limited to, a linear rheostat, a linear variable differential transformer (LVDT), a linear variable capacitor, or any other length measuring device. Alternately, the cable can be replaced with a spring and the tension in the spring measured using a strain gage or other force measuring device or the strain in the seat support structure can be measured by appropriately placing strain gages on one or more of the seat supports. One seat design is illustrated in FIG. 9. Similar weight measurement systems can be designed for other seat designs. Also, some products are available which can approximately measure weight based on pressure measurements made at or near the upper seat surface 236. It should be noted that the weight measured here will not be the entire weight of the occupant since some of the occupant's weight will be supported by his or her feet which are resting on the floor or pedals. As noted above, the weight may also be measured by the weight sensor(s) 6 described above in the seated-state detecting unit.

Figure 9B:
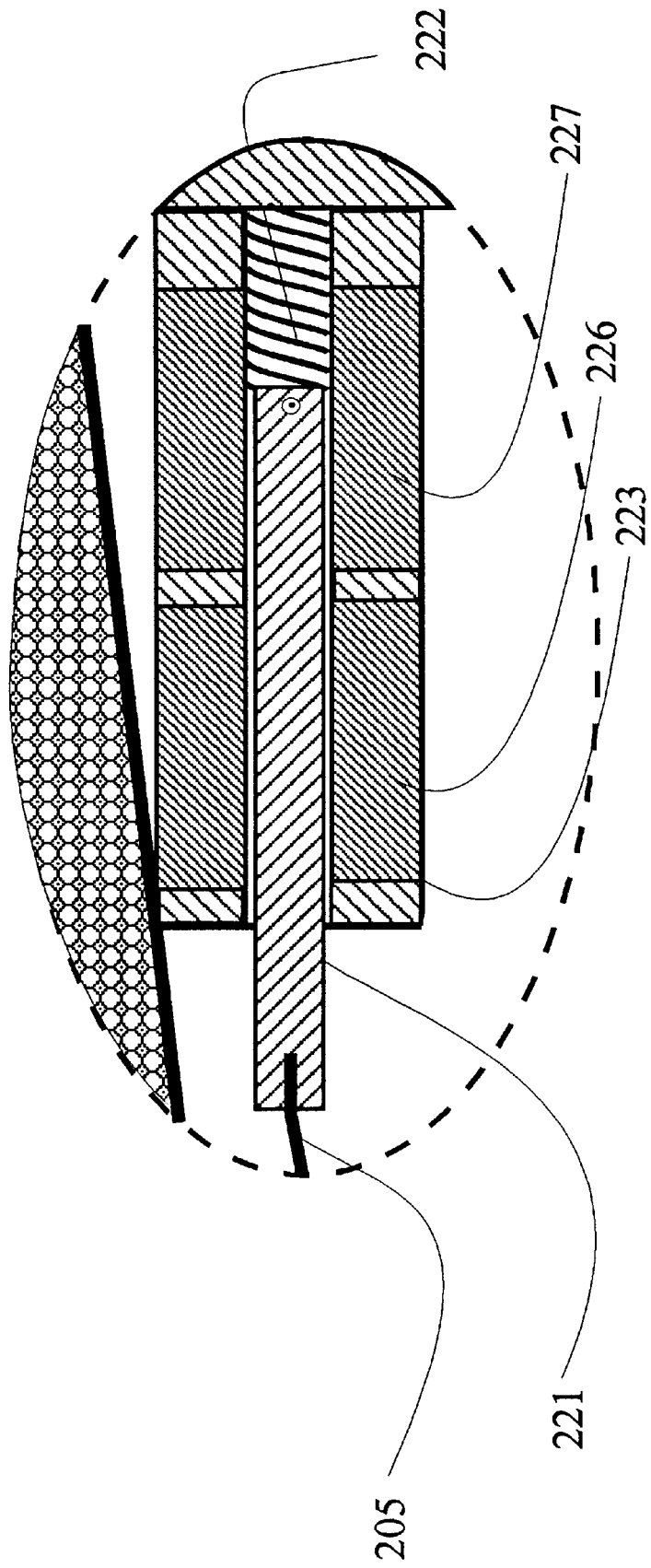
FIG. 9B is an enlarged view of the section designated 9B in FIG. 9A.

As weight is placed on the seat surface 236, it is supported by spring 234 which deflects downward causing cable 205 of the sensor 200 to begin to stretch axially. Using a LVDT as an example of length measuring device 220, the cable 205 pulls on rod 221 tending to remove rod 221 from cylinder 223 (FIG. 9B). The movement of rod 221 out of cylinder 223 is resisted by a spring 222 which returns the rod 221 into the cylinder 223 when the weight is removed from the seat surface 236. The amount which the rod 221 is removed from the cylinder 223 is measured by the amount of coupling between the windings 226 and 227 of the transformer as is well understood by those skilled in the art. LVDT's are commercially available devices. In this matter, the deflection of the seat can be measured which is a measurement of the weight on the seat. The exact relationship between weight and LVDT output is generally determined experimentally for this application.

By use of a combination of weight and height, the driver of the vehicle can in general be positively identified among the class of drivers who operate the vehicle. Thus, when a particular driver first uses the vehicle, the seat will be automatically adjusted to the proper position. If the driver changes that position within a prescribed time period, the new seat position will be stored in the second table for the particular driver's height and weight. When the driver reenters the vehicle and his or her height and weight are again measured, the seat will go to the location specified in the second table if one exists. Otherwise, the location specified in the first table will be used.

This system provides an identification of the driver based on two morphological characteristics which is adequate for most cases. As additional features of the vehicle interior identification and monitoring system described in the above referenced patent applications are implemented, it will be possible to obtain additional morphological measurements of the driver which will provide even greater accuracy in driver identification. Two characteristics may not be sufficient to rely on for theft and security purposes, however, many other driver preferences can still be added to seat position with this level of occupant recognition accuracy. These include the automatic selection of a preferred radio station, vehicle temperature, steering wheel and steering column position, etc.

One advantage of using only the height and weight is that it avoids the necessity of the seat manufacturer from having to interact with the headliner manufacturer, or other component suppliers, since all of the measuring transducers are in the seat. This two characteristic system is generally sufficient to distinguish drivers that normally drive a particular vehicle. This system costs little more than the memory systems now in use and is passive, i.e., it does not require action on the part of the occupant after his initial adjustment has been made.

Instead of measuring the height and weight of the occupant, it is also possible to measure a combination of any two morphological characteristics and during a training phase, derive a relationship between the occupancy of the seat, e.g., adult occupant, child occupant, etc., and the data of the two morphological characteristic. This relationship may be embodied within a neural network so that during use, by measuring the two morphological characteristics, the occupancy of the seat can be determined.

Figure 10:
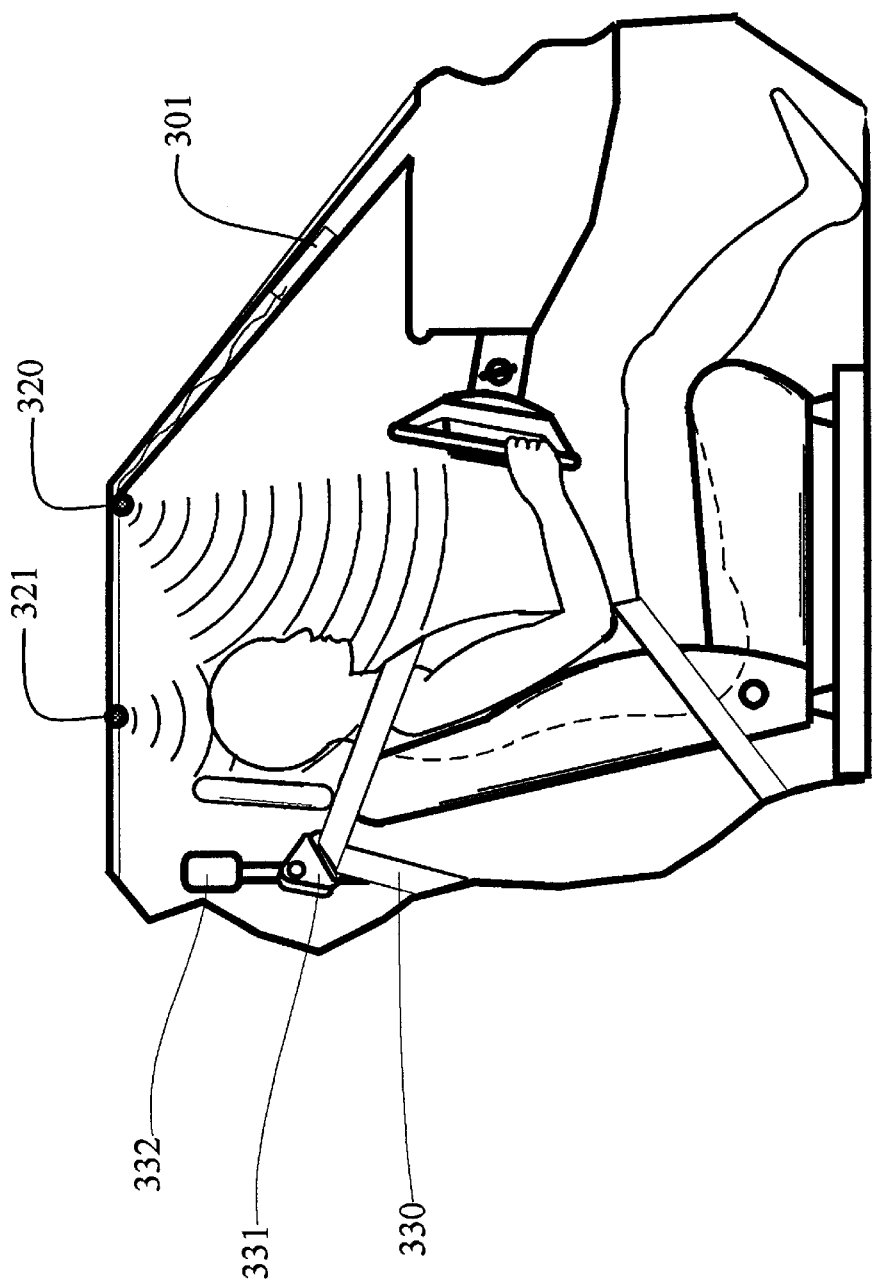
FIG. 10 is a side plan view of the interior of an automobile, with portions cut away and removed, with two occupant height measuring sensors, one mounted into the headliner above the occupant's head and the other mounted onto the A-pillar and also showing a seatbelt associated with the seat wherein the seatbelt has an adjustable upper anchorage point which is automatically adjusted based on the height of the occupant.

Naturally, there are other methods for measuring the height of the driver such as placing the transducers at other locations in the vehicle. Some alternatives are shown in FIG. 10 which is a side plan view wherein two height measuring sensors 320, 321 are shown, sensor 321 being mounted into the headliner above the occupant's head and the other sensor 320 being mounted onto the A-pillar. A sensor as used herein is the combination of two transducers (a transmitter and a receiver) or one transducer which can both transmit and receive. The headliner is the trim which provides the interior surface to the roof of the vehicle and the A-pillar is the roof-supporting member which is on either side of the windshield and on which the front doors are hinged. These transducers may already be present because of other implementations of the vehicle interior identification and monitoring system described in the above referenced patent applications. In this case, the use of both transducers provides a more accurate determination of location of the head of the driver. Using transducer 321 alone, the exact position of the head is ambiguous since the transducer measures the distance to the head regardless of what direction the head is. By knowing the distance from the head to transducer 320, the ambiguity is substantially reduced. This argument is of course dependent on the use of ultrasonic transducers. Optical transducers using CCD or CMOS arrays are now becoming price competitive and, as pointed out in the above referenced patent applications, will be the technology of choice for interior vehicle monitoring. A single CCD array of 160 by 160 pixels, for example, coupled with the appropriate pattern recognition software, can be used to form an image of the head of an occupant and accurately locate the head for the purposes of this invention.

FIG. 10 also illustrates a system where the seatbelt 330 has an adjustable upper anchorage point 331 which is automatically adjusted by a motor 332 to a location optimized based on the height of the occupant. The calculations for this feature and the appropriate control circuitry can also be located in control module 301 or elsewhere if appropriate.

Figure 11:
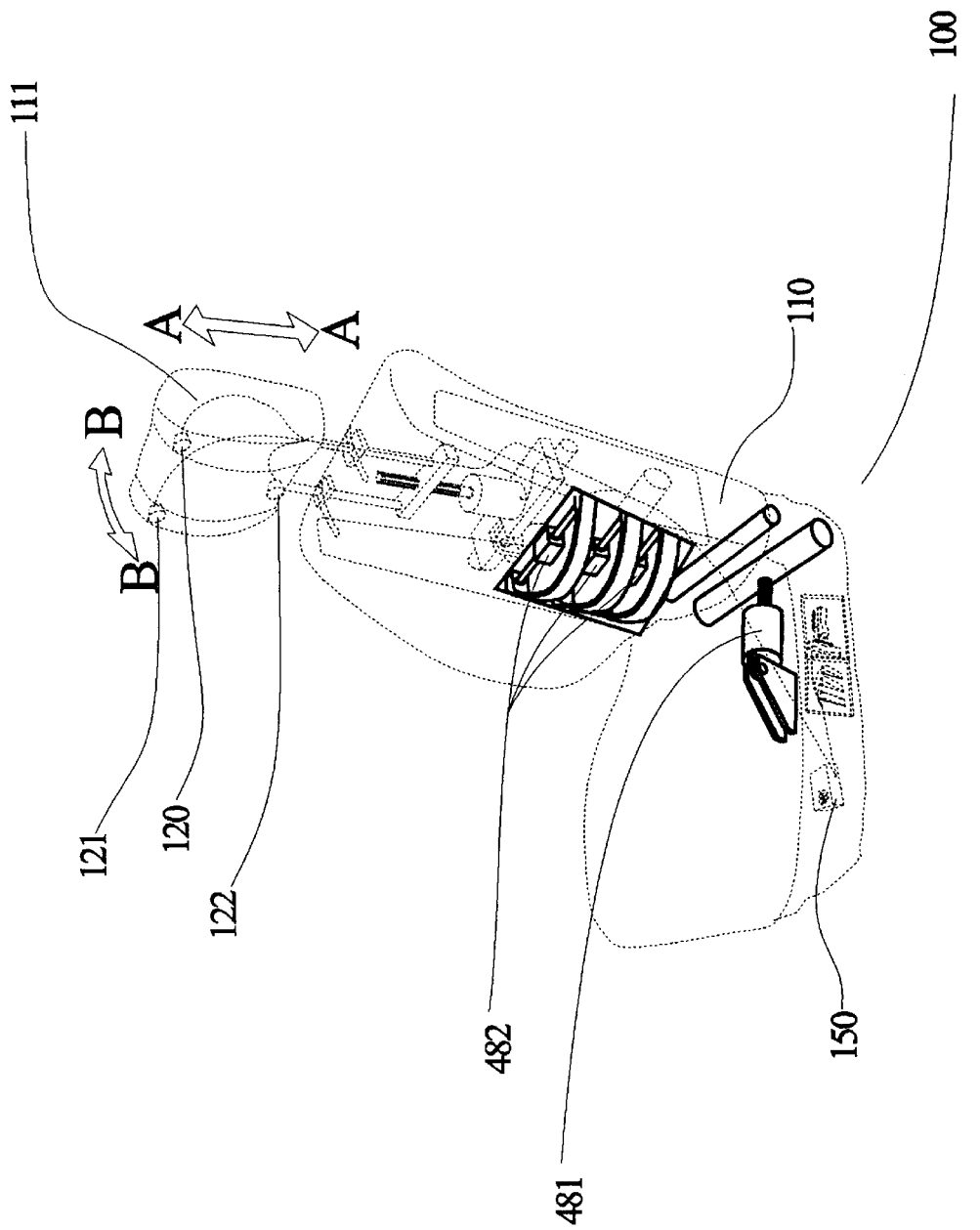
FIG. 11 is a view of the seat of FIG. 8 showing motors for changing the tilt of seat back and the lumbar support.

Many luxury automobiles today have the ability to control the angle of the seat back as well as a lumbar support. These additional motions of the seat can also be controlled by the seat adjustment system in accordance with the invention. FIG. 11 is a view of the seat of FIG. 8 showing motors 481 and 482 for changing the tilt of the seat back and the lumbar support. Three motors 482 are used to adjust the lumbar support in this implementation. The same procedure is used for these additional motions as described for FIG. 8 above.

An initial table is provided based on the optimum positions for various segments of the population. For example, for some applications the table may contain a setting value for each five percentile of the population for each of the 6 possible seat motions, fore and aft, up and down, total seat tilt, seat back angle, lumbar position, and headrest position for a total of 120 table entries. The second table similarly would contain the personal preference modified values of the 6 positions desired by a particular driver.

In FIG. 8, the ultrasonic transducers 120 and 121 were described as one being a transmitter and the other being a receiver. For some applications, it is desirable to use both transducers as both transducers and receivers. Similarly, a third combination transmitter and receiver 122 may also be utilized as shown in FIG. 11. This arrangement permits many of the advantages of a phased array system to be achieved.

The resolution of a transducer is proportional to the ratio of the wavelength to the diameter of the transmitter. Once three transmitters and receivers are used, the approximate equivalent single transmitter and receiver is one which has a diameter approximately equal to the shortest distance between any pair of transducers. In this case, the equivalent diameter is equal to the distance between transmitter 120 or 121 and 122. This provides far greater resolution and, by controlling the phase between signals sent by the transmitters, the direction of the equivalent ultrasonic beam can be controlled. Thus, the head of the driver can be scanned with great accuracy and a map made of the occupant's head. Using this technology plus an appropriate pattern recognition algorithm, such as a neural network, an accurate location of the driver's head can be found even when the driver's head is partially obscured by a hat, coat, or hairdo. This also provides at least one other identification morphological characteristic which can be used to further identify the occupant, namely the diameter of the driver's head.

Figure 12:
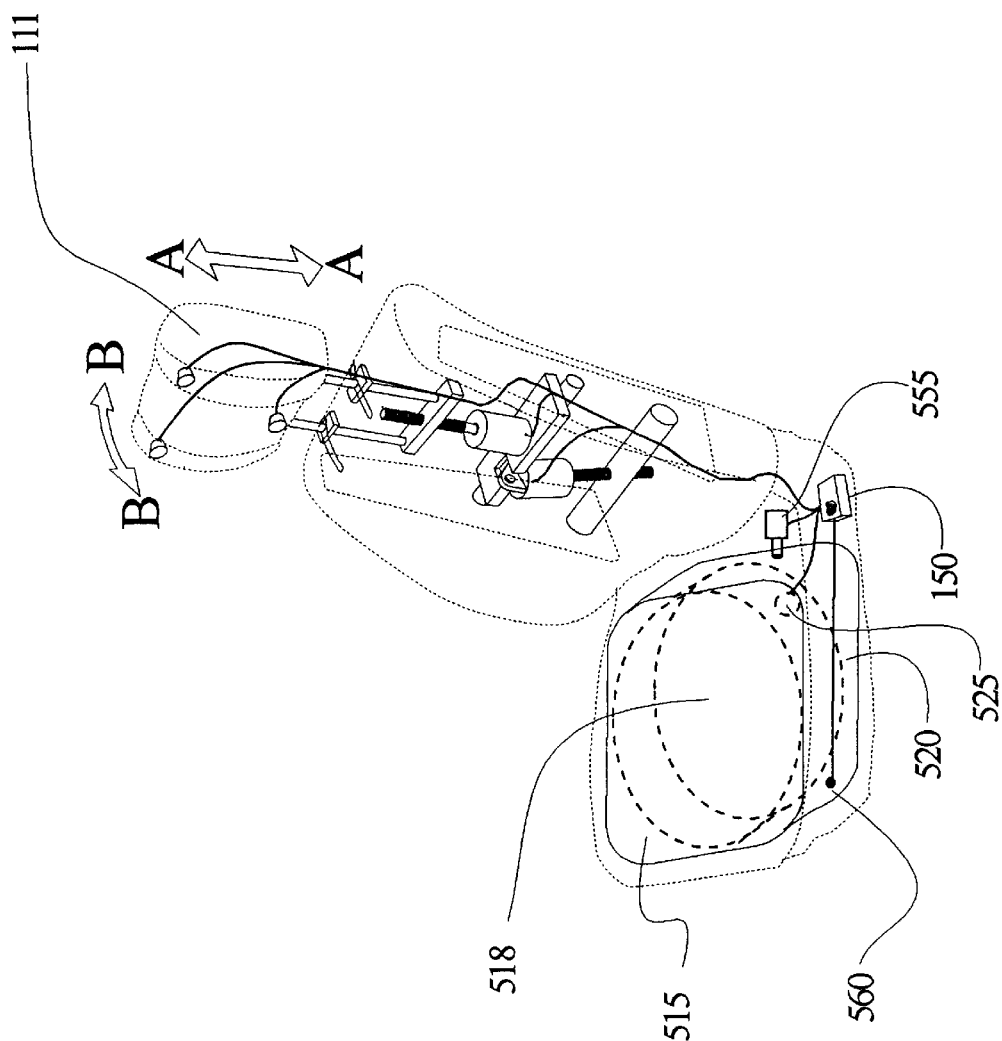
FIG. 12 is a view of the seat of FIG. 8 showing a system for changing the stiffness and the damping of the seat.

With a knowledge of the weight of an occupant, additional improvements can be made to automobile and truck seat designs. In particular, the stiffness of the seat can be adjusted so as to provide the same level of comfort for light and for heavy occupants. The damping of occupant motions, which heretofore has been largely neglected, can also be readily adjusted as shown on FIG. 12 which is a view of the seat of FIG. 8 showing one of several possible arrangements for changing the stiffness and the damping of the seat. In the seat bottom 520, there is a container 515, the conventional foam and spring design has been replaced by an inflated rectangular container very much like an air mattress which contains a cylindrical inner container 518 which is filled with an open cell urethane foam. An adjustable orifice 525 connects the two container 515,518 so that air can flow in a controlled manner therebetween. The amount of opening of orifice 525 is controlled by control circuit 150. A small air compressor 555 controls the pressure in container 515 under control of the control circuit 150. A pressure transducer 560 monitors the pressure within container 515 and inputs this information into control circuit 150.

The operation of the system is as follows. When an occupant sits on the seat, pressure initially builds up in the seat container 515 which gives an accurate measurement of the weight of the occupant. Control circuit 150, using an algorithm and a microprocessor, then determines an appropriate stiffness for the seat and adds pressure to achieve that stiffness. The pressure equalizes between the two containers 515 and 518 through the flow of air through orifice 525. Control circuit 150 also determines an appropriate damping for the occupant and adjusts the orifice 525 to achieve that damping. As the vehicle travels down the road and the road roughness causes the seat to move up and down, the inertial force on the seat by the occupant causes the air pressure to rise and fall in container 518 and also, but, much less so, in container 515 since the occupant sits mainly above container 518 and container 515 is much larger than container 518. The major deflection in the seat takes place first in container 518 which pressurizes and transfers air to container 515 through orifice 525. The size of the orifice opening determines the flow rate between the two containers and therefore the damping of the motion of the occupant. Since this opening is controlled by control circuit 150, the amount of damping can thereby also be controlled. Thus, in this simple structure, both the stiffness and damping can be controlled to optimize the seat for a particular driver. Naturally, if the driver does not like the settings made by control circuit 150, he or she can change them to provide a stiffer or softer ride.

The stiffness of a seat is the change in force divided by the change in deflection. This is important for many reasons, one of which is that it controls the natural vibration frequency of the seat occupant combination. It is important that this be different from the frequency of vibrations which are transmitted to the seat from the vehicle in order to minimize the up and down motions of the occupant. The damping is a force which opposes the motion of the occupant and which is dependent on the velocity of relative motion between the occupant and the seat bottom. It thus removes energy and minimizes the oscillatory motion of the occupant. These factors are especially important in trucks where the vibratory motions of the driver's seat, and thus the driver, have caused many serious back injuries among truck drivers.

Figure 13:
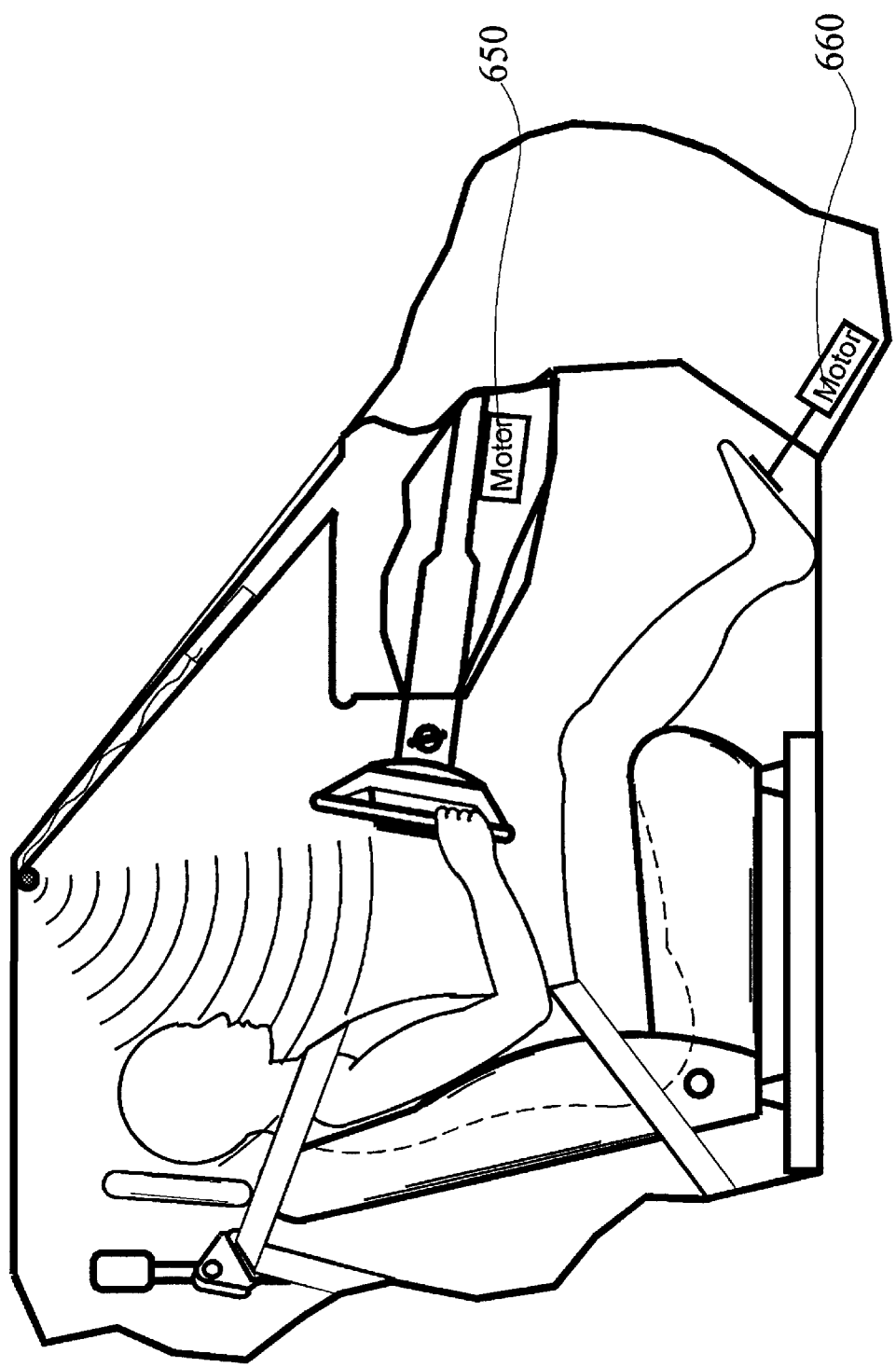
FIG. 13 is a view as in FIG. 10 showing a driver and driver seat with an automatically adjustable steering column and pedal system which is adjusted based on the morphology of the driver.

In an automobile, there is an approximately fixed vertical distance between the optimum location of the occupant's eyes and the location of the pedals. The distant from a driver's eyes to his or her feet, on the other hand, is not the same for all people. An individual driver now compensates for this discrepancy by moving the seat and by changing the angle between his or hers legs and body. For both small and large drivers, this discrepancy cannot be fully compensated for and as a result, their eyes are not appropriately placed. A similar problem exists with the steering wheel. To help correct these problems, the pedals and steering column should be movable as illustrated in FIG. 13 which is a plan view similar to that of FIG. 10 showing a driver and driver seat with an automatically adjustable steering column and pedal system which is adjusted based on the morphology of the driver. In FIG. 13, a motor 650 is connected to and controls the position of the steering column and another motor 660 is connected to and controls the position of the pedals. Both motors 650,660 are coupled to and controlled by control circuit 150 wherein now the basic table of settings includes values for both the pedals and steering column locations.

Figure 14:
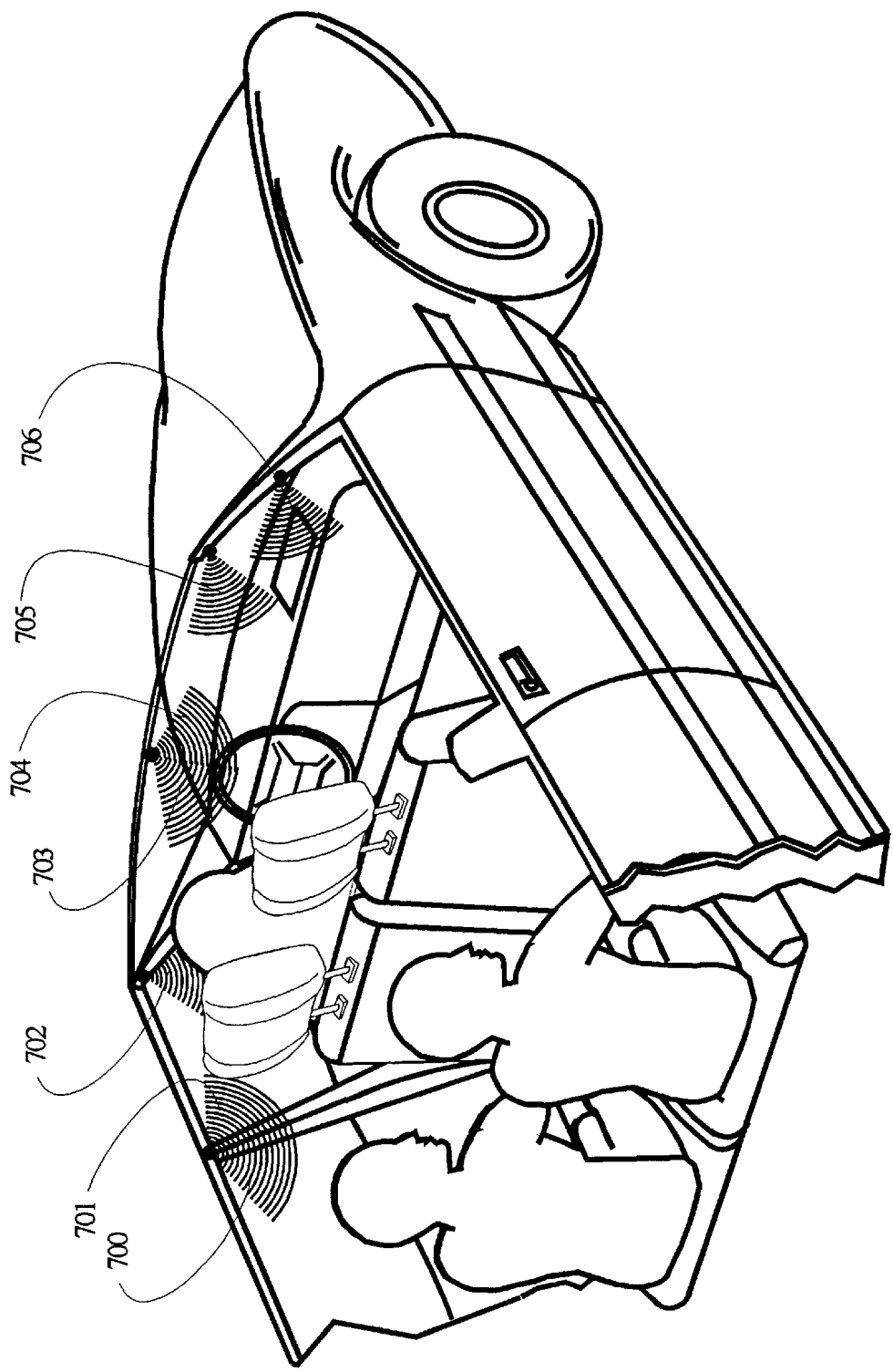
FIG. 14 is a perspective view of the interior of the passenger compartment of an automobile, with parts cut away and removed, showing a variety of transmitters that can be used in a phased array system.

As various parts of the vehicle interior identification and monitoring system described in the above reference patent applications are implemented, a variety of transmitting and receiving transducers will be present in the vehicle passenger compartment. If several of these transducers are ultrasonic transmitters and receivers, they can be operated in a phased array manner, as described above for the headrest, to permit precise distance measurements and mapping of the components of the passenger compartment. This is illustrated in FIG. 14 which is a perspective view of the interior of the passenger compartment showing a variety of transmitters and receivers, 700–706 which can be used in a phased array system. In addition, information can be transmitted between the transducers using coded signals in a ultrasonic network through the vehicle compartment airspace. If one of these sensors is an optical CCD or CMOS array, the location of the driver's eyes can be accurately determined and the results sent to the seat ultrasonically. Obviously, many other possibilities exist.

Figure 15:
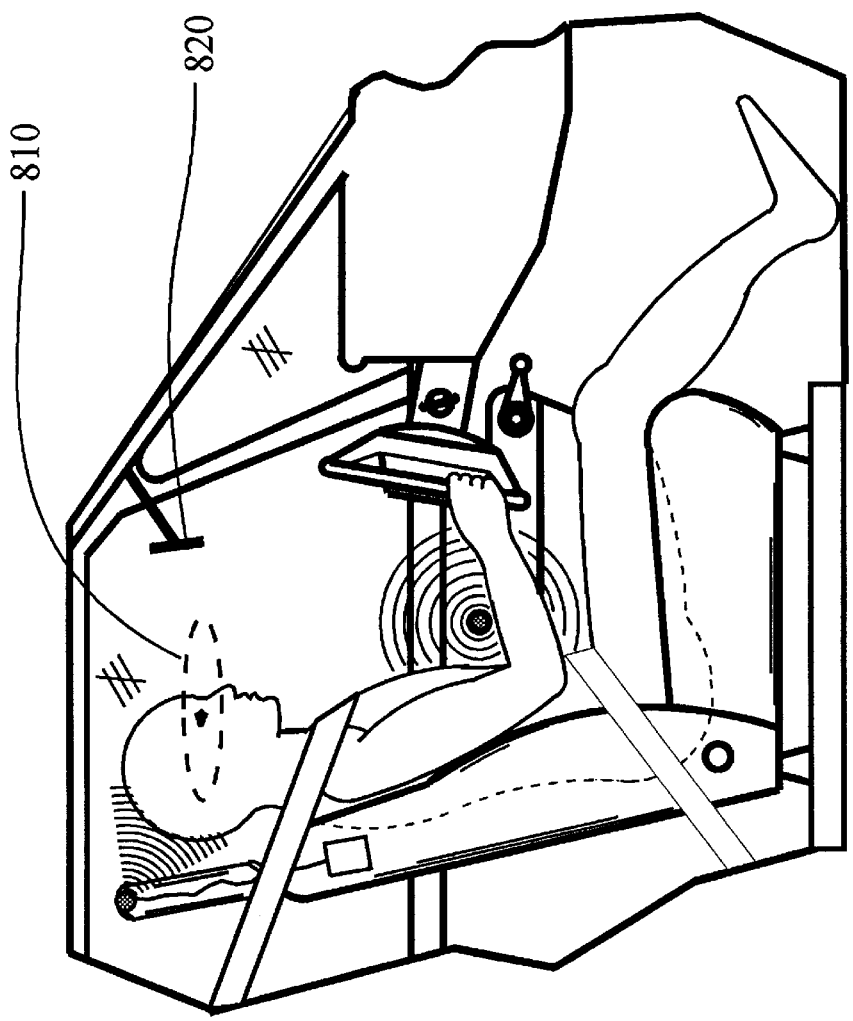
FIG. 15 is a view similar to FIG. 8 showing the occupant's eyes and the seat adjusted to place the eyes at a particular vertical position for proper viewing through the windshield and rear view mirror.

The eye ellipse discussed above is illustrated at 810 in FIG. 15, which is a view similar to FIG. 1, showing the occupant's eyes and the seat adjusted to place the eyes at a particular vertical position for proper viewing through the windshield and rear view mirror. Many systems are now under development to improve vehicle safety and driving ease. For example, right vision systems are being tested which project an enhanced image of the road ahead of the vehicle onto the windshield in a "heads-up display". The main problem with the systems now being tested is that the projected image does not precisely overlap the image as seen through the windshield. This parallax causes confusion in the driver and can only be corrected if the location of the driver's eyes is accurately known. One method of solving this problem is to use the passive seat adjustment system described herein to place the occupant's eyes at the optimum location as described above. Once this has been accomplished, in addition to solving the parallax problem, the eyes are properly located with respect to the rear view mirror 820 and little if any adjustment is required in order for the driver to have the proper view of what is behind the vehicle.

Figure 16:
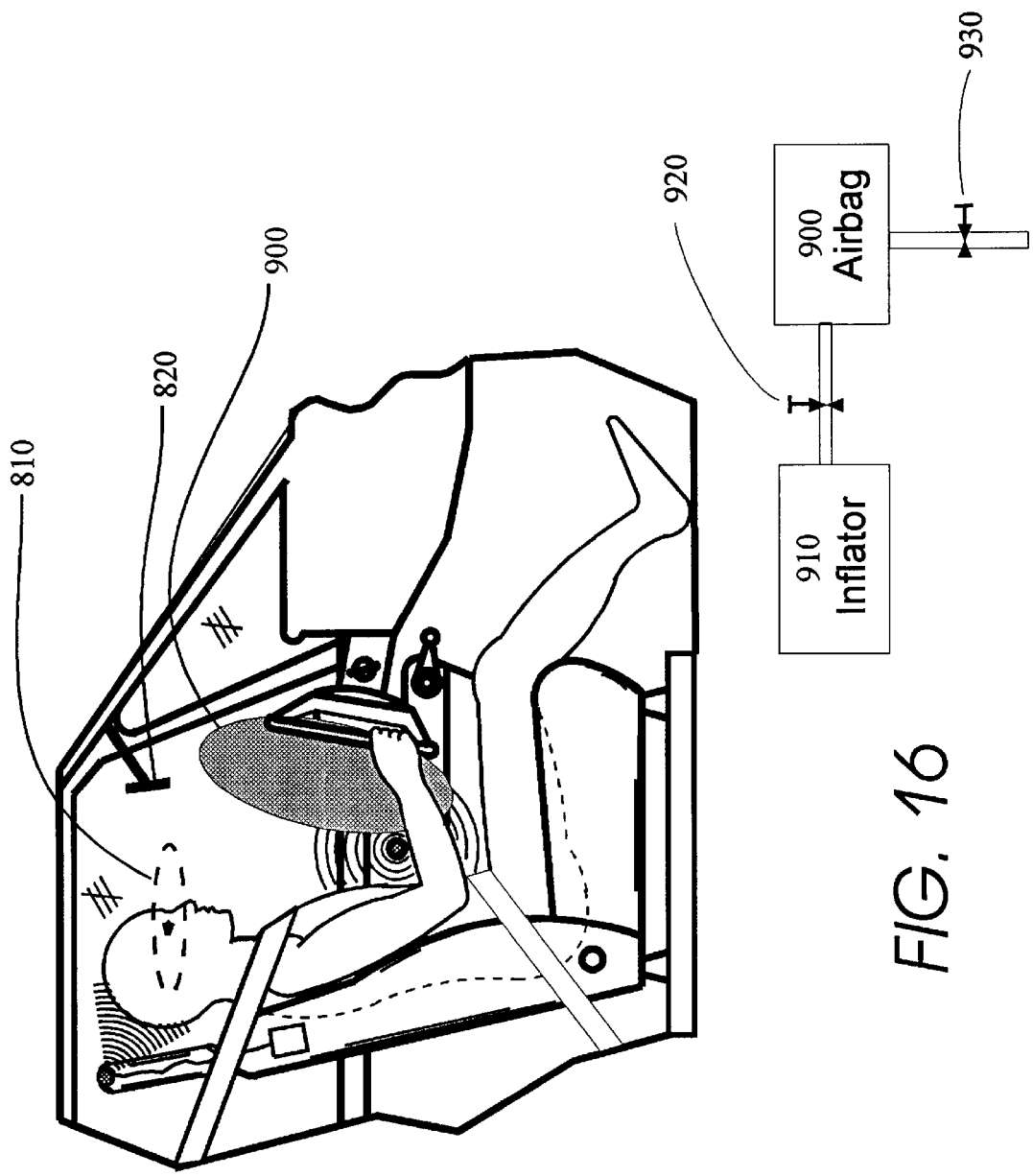
FIG. 16 is a view similar to FIG. 8 showing an inflated airbag and an arrangement for controlling both the flow of gas into and the flow of gas out of the airbag during the crash where the determination is made based on a height sensor located in the headrest and a weight sensor in the seat.

Several systems are in development for determining the location of an occupant and modifying the deployment of the airbag based of his or her position. These systems are called "smart airbags". The passive seat control system in accordance with this invention can also be used for this purpose as illustrated in FIG. 16. This figure is a view similar to FIG. 1 showing an inflated airbag 900 and an arrangement for controlling both the flow of gas into and out of the airbag during a crash. The determination is made based on height sensors 120, 121 and 122 located in the headrest, a weight sensor 200 in the seat and the location of the seat which is known by control circuit 150 (See, FIGS. 8, 9 and 9A). Other smart airbags systems rely only on the position of the occupant determined from various position sensors using ultrasonics or optical sensors.

The weight sensor coupled with the height sensor and the occupant's velocity relative to the vehicle, as determined by the occupant position sensors, provides information as to the amount of energy which the airbag will need to absorb during the impact of the occupant with the airbag. This, along with the location of the occupant relative to the airbag, is then used to determine the amount of gas which is to be injected into the airbag during deployment and the size of the exit orifices which control the rate of energy dissipation as the occupant is interacting with the airbag during the crash. For example, if an occupant is particularly heavy then it is desirable to increase the amount of gas, and thus the initial pressure, in the airbag to accommodate the larger force which will be required to arrest the relative motion of the occupant. Also, the size of the exit orifices should be reduced, since there will be a larger pressure tending to force the gas out of the orifices, in order to prevent the bag from bottoming out before the occupant's relative velocity is arrested. Similarly, for a small occupant the initial pressure would be reduced and the size of the exit orifices increased. If, on the other hand, the occupant is already close to the airbag then the amount of gas injected into the airbag needs to be reduced.

There are many ways of varying the amount of gas injected into the airbag some of which are covered in the patent literature and include, for example, inflators where the amount of gas generated and the rate of generation is controllable. For example, in a particular hybrid inflator manufactured by the Allied Signal Corporation, two pyrotechnic charges are available to heat the stored gas in the inflator. Either or both of the pyrotechnic charges can be ignited and the timing between the ignitions can be controlled to significantly vary the rate of gas flow to the airbag.

The flow of gas out of the airbag is traditionally done through fixed diameter orifices placed in the bag fabric. Some attempts have been made to provide a measure of control through such measures as blowout patches applied to the exterior of the airbag. Other systems were disclosed in U.S. patent application Ser. No. 07/541,464 filed Feb. 9, 1989, now abandoned. FIG. 16A illustrates schematically an inflator 910 generating gas to fill airbag 900 through control valve 920. The flow of gas out of airbag 900 is controlled by exit control valve 930. The valve 930 can be implemented in many different ways including, for example, a motor operated valve located adjacent the inflator and in fluid communication with the airbag or a digital flow control valve as discussed above. When control circuit 150 determines the size and weight of the occupant, the seat position and the relative velocity of the occupant, it then determines the appropriate opening for the exit valve 930, which is coupled to the control circuit 150. A signal is then sent from control circuit 150 to the motor controlling this valve which provides the proper opening.

In a like manner, other parameters can also be adjusted, such as the direction of the airbag, by properly positioning the angle and location of the steering wheel relative to the driver. If seatbelt pretensioners are used, the amount of tension in the seatbelt or the force at which the seatbelt spools out, for the case of force limiters, could also be adjusted based on the occupant morphological characteristics determined by the system of this invention.

Once the morphology of the driver and the seat position is known, many other objects in the vehicle can be automatically adjusted to conform to the occupant. An automatically adjustable seat armrest, a cup holder, the cellular phone, or any other objects with which the driver interacts can be now moved to accommodate the driver. This is in addition to the personal preference items such as the radio station, temperature, etc. discussed above.

Once the system of this invention is implemented, additional features become possible such as a seat which automatically makes slight adjustments to help alleviate fatigue or to account for a change of position of the driver in the seat, or a seat which automatically changes position slightly based on the time of day. Many people prefer to sit more upright when driving at night, for example. Other similar improvements based on a knowledge of the occupant morphology will now become obvious to those skilled in the art.

Although several preferred embodiments are illustrated and described above, there are other possible combinations using different sensors which measure either the same or different morphological characteristics, such as knee position, of an occupant to accomplish the same or similar goals as those described herein. There are also numerous additional applications in addition to those described above. This invention is not limited to the above embodiments and should be determined by the following claims.

It should be mentioned that the adjustment system may be used in conjunction with each vehicle seat. In this case, if a seat is determined to be unoccupied, then the processor means may be designed to adjust the seat for the benefit of other occupants, i.e., if a front passenger side seat is unoccupied but the rear passenger side seat is occupied, then adjustment system might adjust the front seat for the benefit of the rear-seated passenger, e.g., move the seat base forward.

What is claimed is:

1. An adjustment system for adjusting a component of a vehicle based on occupancy of a seat, comprising:

at least one wave sensor for receiving waves from an area of the seat in the passenger compartment and generating an output representative of the waves received by said at least one wave sensor;

weight measurement means associated with the seat for measuring the weight applied onto the seat and generating an output representative of the measured weight applied onto the seat;

adjustment means arranged in connection with the component for adjusting the component, and processor means for receiving the outputs from said at least one wave sensor and said weight measuring means and evaluating the seated-state of the seat based thereon to determine whether the seat is occupied by an object and if the seat is occupied by an object, to identify the object in the seat and based at least on the identification of the object, directing said adjustment means to adjust the component, said processor means including a function correlating the outputs from said at least one wave sensor and said weight measuring means and the seated-state of the seat and being generated by a neural network circuit, the function being executed using the outputs from said at least one wave sensor and said weight measuring means as input to determine the saeted-state of the seat.

2. The system of claim 1, wherein said at least one wave sensor is structured and arranged to transmit waves into the passenger compartment toward the seat.

3. The system of claim 1, wherein said at least one wave sensor is an ultrasonic sensor structured and arranged to receive ultrasonic waves.

4. The system of claim 1, wherein said at least one wave sensor is an electromagnetic sensor structured and arranged to receive electromagnetic waves.

5. The system of claim 1, wherein the component is at least one of a backrest of a seat and a bottom portion of a seat.

6. The system of claim 1, wherein the component is at least one mirror selected from a group consisting of a rear view mirror, a driver side mirror and a passenger side mirror.

7. The system of claim 1, wherein the component is selected from a group consisting of a steering column and a steering wheel.

8. The system of claim 1, wherein the component is at least one pedal selected from a group consisting of an accelerator pedal, a clutch pedal and a brake pedal.

9. The system of claim 1, wherein the component is a valve for regulating the flow of gas into or out of an airbag.

10. The system of claim 1, wherein said processor means comprise a microcomputer into which the function correlating the outputs from said at least one wave sensor and said weight measuring means and the seated-state of the seat is incorporated.

11. The system of claim 1, further comprising a seat track position detecting sensor for determining the position of a seat track of the seat and generating an output representative of the position of the seat track of the seat, said processor means receiving the outputs from said at least one wave sensor, said weight measuring means and said seat track position sensor and evaluating the seated-state of the seat based thereon.

12. The system of claim 1, further comprising a reclining angle detecting sensor for determining the reclining angle of the seat back and generating an output representative of the reclined angle of the seat back, said processor means receiving the outputs from said at least one wave sensor, said weight measuring means and said reclining angle detecting sensor and evaluating the seated-state of the seat based thereon.

13. The system of claim 1, further comprising a heart beat sensor for detecting the heart beat of the occupant and generating an output representative thereof, said processor means receiving the outputs from said at least one wave sensor, said weight measuring means and said heart beat sensor and evaluating the seated-state of the seat based thereon.

14. The system of claim 1, further comprising a capacitive sensor arranged in connection with the seat for detecting the presence of the occupant and generating an output representative of the presence of the occupant, said processor means receiving the outputs from said at least one wave sensor, said weight measuring means and said capacitive sensor and evaluating the seated-state of the seat based thereon.

15. The system of claim 1, further comprising a motion sensor for detecting movement of the occupant and generating an output representative thereof, said processor means receiving the outputs from said at least one wave sensor, said weight measuring means and said motion sensor and evaluating the seated-state of the seat based thereon.

16. The system of claim 1, wherein said weight measuring means comprise a sensor structured and arranged to identify an adult or a child based on a comparison of the measured weight with a reference value.

17. The system of claim 1, further comprising
height measuring means for measuring the height of the occupant of the seat from the seat, said processor means being coupled to said height measuring means and directing said height measuring means to measure the height of the occupant from the seat when the occupant is determined to be unrestrained by a child seat, said processor means further being arranged to direct said adjustment means to adjust the component based on the output of said height measuring means and on the output of said weight measuring means representative of the measured weight applied onto the seat.

18. The system of claim 1, further comprising
height measuring means for measuring the height of the occupant of the seat from the seat, said processor means being coupled to said height measuring means and directing said height measuring means to measure the height of the occupant from the seat when the occupant is determined to be unrestrained by a child seat, said processor means further being arranged to direct said adjustment means to adjust the component based on the output of said height measuring means.

19. The system of claim 18, wherein said seat further comprises a headrest, said height-measuring means being attached to or at least partially incorporated within said headrest.

20. The system of claim 18, wherein the vehicle has a headliner and said height measuring means are attached to said headliner.

21. The system of claim 18, wherein the vehicle has a roof including support pillars and said height measuring means are attached to at least one of said support pillars.

22. The system of claim 1, wherein said weight measuring means are attached to the seat.

23. A method for adjusting a component of a vehicle based on occupancy of a seat, comprising the steps of:
receiving waves from an area of the seat in the passenger compartment and generating an output representative of the received waves;
measuring the weight applied onto the seat and generating an output representative of the measured weight applied onto the seat;
evaluating the seated-state of the seat based on the outputs representative of the received waves and the measured weight applied onto the seat to determine whether the seat is occupied by an object and if the seat is occupied by an object, to identify the object in the seat, and
adjusting the component based on the evaluation of the seated-state thereof,
the step of evaluating the seated-sate of the seat comprising the steps of:
generating a function correlating the outputs representative of the received waves and the measured weight and the seated-state of the seat in a neural network circuit, and
executing the function using the outputs representative of the received waves and the measured weight as input.

24. The method of claim 23, wherein the step of evaluating the seated-state of the seat further comprises the step of:
   incorporating the correlation function into a microcomputer.

25. The method of claim 23, further comprising the steps of:
   determining the position of a seat track of the seat and generating an output representative of the position of the seat track of the seat, and
   evaluating the seated-state of the seat based on the outputs representative of the received waves and the measured weight and the determined position of the seat track.

26. The method of claim 23, further comprising the steps of:
   determining the reclining angle of the seat and generating an output representative of the reclined angle of the seat, and
   evaluating the seated-state of the seat based on the outputs representative of the received waves and the measured weight and the determined reclining angle of the seat.

27. The method of claim 23, further comprising the steps of:
   comparing the output representative of the measured weight with a reference value, and
   identifying an adult or a child based on the comparison of the measured weight with the reference value.

28. In a motor vehicle having a passenger compartment including a seat having a headrest at least one component each adjustable by an occupant of the seat, and respective control means for controlling adjustment of the at least one component, an automatic adjustment system comprising:
   first measurement means for measuring a first morphological characteristic of the occupant and generating a first signal based on said first measured morphological characteristic, the first morphological characteristic being the height of the occupant from a bottom of the seat, said first measurement means comprising at least one transducer arranged in and fixed relative to the headrest and structured and arranged to at least receive waves reflected or emananting from the occupant of the seat and displacement means for moving the headrest to a plurality of different positions to thereby enable the height of the occupant to be determined based on the waves reflected from the occupant and received by said at least one transducer,
   second measurement means for measuring a second morphological characteristic of the occupant different than said first morphological characteristic and generating a second signal based on said second measured morphological characteristic, and
   a processor for determining an optimum position or operation of the at least one component for the occupant based on said first and second measured morphological characteristics, said processor providing a control signal to said respective control means to adjust the at least one component to the optimum position or to provide the optimum operation.

29. The system of claim 28, wherein the component is at least one of a backrest of a seat and a bottom portion of a seat and said processor determines an optimum position thereof.

30. The system of claim 28, wherein the component is at least one mirror selected from a group consisting of a rear view mirror, a driver side mirror and a passenger side mirror and said processor determines an optimum position thereof.

31. The system of claim 28, wherein the component is selected from a group consisting of a steering column and a steering wheel and said processor determines an optimum position thereof.

32. The system of claim 28, wherein the component is at least one pedal selected from a group consisting of an accelerator pedal, a clutch pedal and a brake pedal and said processor determines an optimum position thereof.

33. The system of claim 28, wherein the component is a valve for regulating the flow of gas into or out of an airbag and said processor determines optimum operation thereof.

34. The system of claim 28, wherein the second morphological characteristic is selected from a group consisting of the weight of the occupant, the length of the occupant's arms, the length of the occupant's legs and the inclination of the occupant's back relative to the seat.

35. The system of claim 28, wherein the second morphological characteristic is the inclination of the occupant's back relative to the seat.

36. The system of claim 28, wherein the second morphological characteristic is the length of the occupant's legs.

37. The system of claim 28, wherein the second morphological characteristic is the length of the occupant's arms.

38. In a motor vehicle having a passenger compartment including a seat having a headrest, at least one component each adjustable by an occupant of the seat, and respective control means for controlling adjustment of the at least one component, a method for automatically adjustment the component comprising the steps of:
   measuring a first morphological characteristic of the occupant and generating a first signal based on said first measured morphological characteristic, said first morphological characteristic being the height of the occupant from a bottom of the seat, said step of measuring the height of the occupant from the bottom of the seat comprising the steps of
      arranging at least one transducer in and fixed relative to the headrest, the at least one transducer receiving waves reflected or emanating from the occupant of the seat, and
      displacing the headrest to a plurality of different positions to thereby enable the height of the occupant to be determined based on the waves reflected from the occupant and received by the at least one transducer,
   measuring a second morphological characteristic of the occupant different than said first morphological characteristic and generating a second signal based on said second measured morphological characteristic,
   determining an optimum position or operation of the at least one component for the occupant based on said first and second measured morphological characteristics, and
   providing a control signal to said respective control means to adjust the at least one component to the determined optimum position or to provide the optimum operation.

39. The method of claim 38, wherein the component is at least one of a backrest of a seat and a bottom portion of a seat that is adjusted by said control means to the optimum position.

40. The method of claim 38, wherein the component is at least one mirror selected from a group consisting of a rear view mirror, a driver side mirror and a passenger side mirror which is adjusted by said control means to the optimum position.

41. The method of claim 38, wherein the component is selected from a group consisting of a steering column and a steering wheel which is adjusted by said control means to the optimum position.

42. The method of claim 38, wherein the component is at least one pedal selected from a group consisting of an accelerator pedal, a clutch pedal and a brake pedal which is adjusted by said control means to the optimum position.

43. The method of claim 38, wherein the component is a valve for regulating the flow of gas into or out of an airbag that is adjusted by said control means to provide the optimum operation thereof.

44. The method of claim 38, further comprising the step of:

selecting the second morphological characteristics from a group consisting of the weight of the occupant, the length of the occupant's arms, the length of the occupant's legs and the inclination of the occupant's back relative to the seat.

45. The method of claim 38, wherein the second morphological characteristic is the inclination of the occupant's back relative to the seat.

46. The method of claim 38, wherein the second morphological characteristic is the length of the occupant's legs.

47. The method of claim 38, wherein the second morphological characteristic is the length of the occupant's arms.

* * * * *

UNITED STATES PATENT AND TRADEMARK OFFICE
CERTIFICATE OF CORRECTION

PATENT NO. : 6,078,854  
DATED : June 20, 2000  
INVENTOR(S) : David S. Breed, Wilbur E. DuVall, Jeffrey Morin It is certified that error appears in the above-identified patent and that said Letters Patent is hereby corrected as shown below:

Column 27,
Line 4, delete "circuit".

Column 28,
Line 64, delete "circuit".

Column 29,
Line 47, after "reflected", insert -- or emanating --.

Column 30,
Line 42, after "reflected", insert -- or emanating --.

Signed and Sealed this

Twenty-fifth Day of December, 2001

Attest:

JAMES E. ROGAN
Attesting Officer    Director of the United States Patent and Trademark Office